(12) United States Patent
 Tan et al.

(10) Patent No.: US 11,760,651 B1
(45) Date of Patent: Sep. 19, 2023

(54) ELECTRODES, ELECTRODE MATERIALS, AND MANUFACTURING THEREOF

(71) Applicant: UNIGRID, Inc., San Diego, CA (US)

(72) Inventors: Darren Huan Shen Tan, San Diego, CA (US); Erik Austin Wu, San Diego, CA (US)

(73) Assignee: UNIGRID, INC., San Diego, CA (US)

( * ) Notice: Subject to any disclaimer, the term of this patent is extended or adjusted under 35 U.S.C. 154(b) by 0 days.

(21) Appl. No.: 17/968,736

(22) Filed: Oct. 18, 2022

(51) Int. Cl.
 *C01G 19/02* (2006.01)
 *H01M 50/46* (2021.01)
(52) U.S. Cl.
 CPC ............ *C01G 19/02* (2013.01); *H01M 50/46* (2021.01); *C01P 2006/40* (2013.01)
(58) Field of Classification Search
 CPC combination set(s) only.
 See application file for complete search history.

(56) References Cited

PUBLICATIONS

Lu et al., Na2SnO3 as a novel anode for high performance lithium storage and its electrochemical reaction mechanism, May 2019, Electrochim. Acta, 315, 48-57 (Year: 2019).*

Iwasaki et al., Synthesis and crystal structure of Na4Sn3O8, J. Mater. Chem., Jan. 2002, 12, 1068-1070 (Year: 2002).*

\* cited by examiner

*Primary Examiner* — Daniel S Gatewood
(74) *Attorney, Agent, or Firm* — PROCOPIO, CORY, HARGREAVES & SAVITCH LLP

(57) ABSTRACT

Provided herein are high performance compounds, compositions, and composite materials of sodium (Na), tin (Sn), and oxygen (O). Electrodes and batteries incorporating the compounds, compositions, and composite materials are disclosed. Methods of manufacturing the compounds, compositions, and composite materials are also disclosed.

30 Claims, 10 Drawing Sheets

ELECTRODES, ELECTRODE MATERIALS, AND MANUFACTURING THEREOF

FIELD OF THE INVENTION

The field relates to electrodes and electrode material, cells and batteries comprising the same, and the manufacturing thereof.

BACKGROUND OF THE INVENTION

Batteries comprise one or more electrochemical cell, such cells generally comprising a cathode, an anode and an electrolyte. Sodium ion secondary batteries use a sodium transition metal oxide or ferrocyanide positive electrode active material and a hard carbon-based negative electrode active material and uses an organic liquid electrolyte to ensure sodium ionic conductivity between the positive electrode and the negative electrode.

SUMMARY OF THE INVENTION

According to one aspect of the present disclosure, provided in certain embodiments herein are compounds having a chemical formula of $Na_xSnO_y$, wherein x is no more than 5.0, and wherein y is less than 2.0.

In some embodiments, y is from 0.1 to 1.9. In some embodiments, y is from 0.3 to 1.7. In some embodiments, y is from 0.5 to 1.5. In some embodiments, y is from 0.7 to 1.3. In some embodiments, y is from 0.9 to 1.1. In some embodiments, y is about 1.0.

In some embodiments, x is from 0.1 to 5.0. In some embodiments, x is from 0.1 to 3.75. In some embodiments, x is from 0.3 to 3.5. In some embodiments, x is from 0.5 to 3.0. In some embodiments, x is from 0.8 to 2.8. In some embodiments, x is about 1.2. In some embodiments, x is about 1.8. In some embodiments, x is about 2.4.

According to one aspect of the present disclosure, provided in certain embodiments herein are compositions consisting essentially of sodium (Na), tin (Sn), and oxygen (O), wherein a molar ratio between O and Sn is less than 2.0.

In some embodiments, the molar ratio between O and Sn is from 0.1 to 1.9. In some embodiments, the molar ratio between O and Sn is from 0.3 to 1.7. In some embodiments, the molar ratio between O and Sn is from 0.5 to 1.5. In some embodiments, the molar ratio between O and Sn is from 0.7 to 1.3. In some embodiments, the molar ratio between O and Sn is from 0.9 to 1.1. In some embodiments, the molar ratio between O and Sn is about 1.0.

In some embodiments, a molar ratio between Na and Sn is less than 5.0. In some embodiments, a molar ratio between Na and Sn is from 0.1 to 3.75. In some embodiments, a molar ratio between Na and Sn is from 0.3 to 3.5. In some embodiments, a molar ratio between Na and Sn is from 0.5 to 3.0. In some embodiments, a molar ratio between Na and Sn is from 0.8 to 2.8. In some embodiments, a molar ratio between Na and Sn is about 1.2. In some embodiments, a molar ratio between Na and Sn is about 1.8. In some embodiments, a molar ratio between Na and Sn is about 2.4.

In some embodiments, the composition consists of sodium (Na), tin (Sn), and oxygen (O).

In some embodiments, the composition is amorphous.

In some embodiments, the composition is in a form of micro-sized and/or nano-sized particles. In some embodiments, the particles have an average diameter of from about 10 nm to about 50 µm. In some embodiments, the particles have an average diameter of from about 100 nm to about 10 µm. In some embodiments, the particles have an average diameter of from about 1 µm to about 5 µm.

According to one aspect of the present disclosure, provided in certain embodiments herein are composite materials formed by contacting tin oxide with a reducing agent or by electrochemically reducing tin oxide, wherein a molar ratio between O and Sn in the composite material is less than 2.0.

In some embodiments, the reducing agent is sodium metal. In some embodiments, the sodium metal is combined with tin oxide in a melt reaction vessel, and optionally further ball milled with a milling media, to form the composite material. In some embodiments, the tin oxide is in contact with the sodium metal in the presence of an electrolyte, and wherein optionally the tin oxide is coated on a current collector.

In some embodiments, the reducing agent is an organic sodium salt. In some embodiments, the organic sodium salt is sodium biphenyl, sodium naphthalene, or combination thereof.

In some embodiments, the composite material is formed by electrochemically reducing tin oxide by a sodium based counter electrode. In some embodiments, the sodium based counter electrode comprise a counter electrode material selected from the group consisting of sodium metal, sodium transition metal oxides, sodium peroxides, sodium carbonate, sodium oxide, sodium nitrate, sodium nitride, sodium organic salts, and combinations thereof.

In some embodiments, the molar ratio between O and Sn is from 0.1 to 1.9. In some embodiments, the molar ratio between O and Sn is from 0.3 to 1.7. In some embodiments, the molar ratio between O and Sn is from 0.5 to 1.5. In some embodiments, the molar ratio between O and Sn is from 0.7 to 1.3. In some embodiments, the molar ratio between O and Sn is from 0.9 to 1.1. In some embodiments, the molar ratio between O and Sn is about 1.0.

In some embodiments, a molar ratio between Na and Sn is less than 5.0. In some embodiments, a molar ratio between Na and Sn is from 0.1 to 3.75. In some embodiments, a molar ratio between Na and Sn is from 0.3 to 3.5. In some embodiments, a molar ratio between Na and Sn is from 0.5 to 3.0. In some embodiments, a molar ratio between Na and Sn is from 0.8 to 2.8. In some embodiments, a molar ratio between Na and Sn is about 1.2. In some embodiments, a molar ratio between Na and Sn is about 1.8. In some embodiments, a molar ratio between Na and Sn is about 2.4.

In some embodiments, the composite material consists of sodium (Na), tin (Sn), and oxygen (O).

In some embodiments, the composite material is amorphous.

In some embodiments, the composite material is in a form of micro-sized and/or nano-sized particles. In some embodiments, the particles have an average diameter of from about 10 nm to about 50 µm. In some embodiments, the particles have an average diameter of from about 100 nm to about 10 µm. In some embodiments, the particles have an average diameter of from about 1 µm to about 5 µm.

According to one aspect of the present disclosure, provided in certain embodiments herein are negative electrodes comprising the compound, the composition, or the composite material disclosed herein.

In some embodiments, the compound, the composition, or the composite material disclosed herein is present in an active material layer coated over a current collector in the negative electrode.

In some embodiments, the active material layer comprises at least 1 wt % of the compound, the composition, or the composite material disclosed herein. In some embodiments, the active material layer comprises at least 10 wt % of the compound, the composition, or the composite material disclosed herein. In some embodiments, the active material layer comprises at least 20 wt % of the compound, the composition, or the composite material disclosed herein. In some embodiments, the active material layer comprises at least 40 wt % of the compound, the composition, or the composite material disclosed herein. In some embodiments, the active material layer comprises at least 60 wt % of the compound, the composition, or the composite material disclosed herein. In some embodiments, the active material layer comprises at least 80 wt % of the compound, the composition, or the composite material disclosed herein. In some embodiments, the active material layer comprises at least 90 wt % of the compound, the composition, or the composite material disclosed herein.

In some embodiments, the compound, the composition, or the composite material disclosed herein is formed before it is incorporated into the negative electrode. In some embodiments, the compound, the composition, or the composite material disclosed herein is combined with a solvent to form a slurry, applied to the current collector, and dried to form the active material layer.

In some embodiments, the solvent is a non-polar organic solvent. In some embodiments, the solvent is selected from the group consisting of xylene, toluene, hexane, heptane, isobutyl butyrate, or combinations thereof. In some embodiments, the solvent is xylene.

In some embodiments, the solvent is a polar solvent. In some embodiments, the solvent is water. In some embodiments, the solvent is N-Methyl-2-pyrrolidone (NMP).

In some embodiments, the slurry further comprises a conductive material.

In some embodiments, the conductive material is selected from the group consisting of graphite, carbon black, carbon fibers or metal fibers, metal powder, conductive whiskers, conductive metal oxide, activated carbon, polyphenylene derivatives, and combinations thereof. In some embodiments, the conductive material is selected from the group consisting of natural graphite, artificial graphite, super-p, acetylene black, ketjen black, channel black, furnace black, lamp black, thermal black, denka black, vapor grown carbon fibre, and combinations thereof.

In some embodiments, the active material layer comprises from 0.1% to 20% by weight of the conductive material.

In some embodiments, the slurry further comprises a binder resin.

In some embodiments, the binder resin is selected from the group consisting of polyvinylidene difluoride, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, polyacrylic acid, polyacrylic acid salt derivatives, and combinations thereof.

In some embodiments, the active material layer comprises no more than 20 wt % of the binder resin. In some embodiments, the active material layer comprises less than 10 wt % of the binder resin. In some embodiments, the active material layer comprises less than 5 wt % of the binder resin.

In some embodiments, the compound, the composition, or the composite material disclosed herein is formed in situ with the active material layer.

In some embodiments, tin oxide is combined with a solvent to form a slurry, applied to the current collector, and dried to form an active material precursor layer that is subsequently reduced by a sodium-containing organic salt to form the active material layer.

In some embodiments, the solvent is a non-polar organic solvent. In some embodiments, the solvent is selected from the group consisting of xylene, toluene, hexane, heptane, isobutyl butyrate, or combinations thereof. In some embodiments, the solvent is xylene.

In some embodiments, the solvent is a polar solvent. In some embodiments, the solvent is water. In some embodiments, the solvent is N-Methyl-2-pyrrolidone (NMP).

In some embodiments, the slurry further comprises a conductive material.

In some embodiments, the conductive material is selected from the group consisting of graphite, carbon black, carbon fibers or metal fibers, metal powder, conductive whiskers, conductive metal oxide, activated carbon, polyphenylene derivatives, and combinations thereof. In some embodiments, the conductive material is selected from the group consisting of natural graphite, artificial graphite, super-p, acetylene black, ketjen black, channel black, furnace black, lamp black, thermal black, denka black, vapor grown carbon fibre, and combinations thereof.

In some embodiments, the active material layer comprises from 0.1% to 20% by weight of the conductive material.

In some embodiments, the slurry further comprises a binder resin.

In some embodiments, the binder resin is selected from the group consisting of polyvinylidene difluoride, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, polyacrylic acid, polyacrylic acid salt derivatives, and combinations thereof.

In some embodiments, the active material layer comprises no more than 20 wt % of the binder resin. In some embodiments, the active material layer comprises less than 10 wt % of the binder resin. In some embodiments, the active material layer comprises less than 5 wt % of the binder resin.

In some embodiments, the sodium-containing organic salt is sodium biphenyl. In some embodiments, the sodium-containing organic salt is sodium naphthalene.

In some embodiments, the active material layer exhibits an electronic conductivity of at least 0.08 S cm$^{-1}$.

In some embodiments, the active material layer exhibits an electronic conductivity of from 0.10 S cm$^{-1}$ to 100 S cm$^{-1}$. In some embodiments, the active material layer exhibits an electronic conductivity of from 0.10 S cm$^{-1}$ to 1.0 S cm$^{-1}$. In some embodiments, the active material layer exhibits an electronic conductivity of from 0.10 S cm$^{-1}$ to 0.5 S cm$^{-1}$. In some embodiments, the active material layer exhibits an electronic conductivity of from 0.15 S cm$^{-1}$ to 0.4 S cm$^{-1}$.

In some embodiments, the negative electrode active material has a bulk density before first charge/discharge cycle of 1 to 7 g/cm$^3$. In some embodiments, the negative electrode active material has a bulk density before first charge/discharge cycle of 2 to 7 g/cm$^3$.

According to one aspect of the present disclosure, provided in certain embodiments herein are batteries comprising: a) the negative electrode disclosed herein, b) a positive electrode and c) an electrolyte comprising a solid state electrolyte or a liquid electrolyte soaked separator membrane interposed between the negative electrode and the positive electrode.

In some embodiments, the electrolyte comprises at least one solid or liquid electrolyte material selected from the group consisting of solid borohydride material ($Na_2B_{10}H_{10}$, $Na_2B_{12}H_{12}$, $NaCB_{11}H_{12}$), solid sulfide-based solid electrolyte ($Na_3PS_4$), liquid ether based electrolyte ($NaPF_6$ in Diethylene glycol dimethyl or other ethers), liquid carbonate based electrolyte ($NaPF_6$ in Ethylene carbonate and Dimethyl carbonate), or combination thereof.

In some embodiments, the positive electrode comprises a positive electrode active material layer, the positive electrode active material layer comprises sodium transition metal oxide active material as a positive electrode active material, and the transition metal comprises at least one of Cr, Mn, Fe or V.

In some embodiments, the positive electrode comprises a positive electrode active material layer, the positive electrode active material layer comprises sodium ferrocyanide positive electrode as a positive electrode active material, and the positive electrode comprises at least one of Fe or Mn.

In some embodiments, the positive electrode active material layer further comprises at least one of a binder resin, a conductive material or a solid electrolyte.

In some embodiments, the positive electrode active material layer is obtained using the positive electrode active material, the conductive material and the binder resin by a manufacturing method according to a dry mixing process without a solvent.

In some embodiments, the battery has an NP ratio of 0.1 to 30. In some embodiments, the battery has an NP ratio of 0.5 to 10. In some embodiments, the battery has an NP ratio of 0.8 to 10. In some embodiments, the battery has an NP ratio of 1.0 to 10. In some embodiments, the battery has an NP ratio of 1.0 to 5. In some embodiments, the battery has an NP ratio of 1.0 to 1.5.

In some embodiments, the battery has a coulombic efficiency of at least 95% for the first 12 cycles. In some embodiments, the battery has a coulombic efficiency of at least 95% for the first 8 cycles. In some embodiments, the battery has a coulombic efficiency of at least 95% for the first 6 cycles. In some embodiments, the battery has a coulombic efficiency of at least 95% for the first 4 cycles. In some embodiments, the battery has a coulombic efficiency of at least 95% for the first 2 cycles.

In some embodiments, the battery has a normalized discharge capacity of at least 0.95 after 2 cycles. In some embodiments, the battery has a normalized discharge capacity of at least 0.90 after 4 cycles. In some embodiments, the battery has a normalized discharge capacity of at least 0.90 after 6 cycles. In some embodiments, the battery has a normalized discharge capacity of at least 0.85 after 8 cycles. In some embodiments, the battery has a normalized discharge capacity of at least 0.85 after 12 cycles.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification.

BRIEF DESCRIPTION OF THE DRAWINGS

It is to be expressly understood that the drawings are for the purpose of illustration and description only and are not intended as a definition of the limits of the invention.

DETAILED DESCRIPTION OF THE INVENTION

Figure 1:
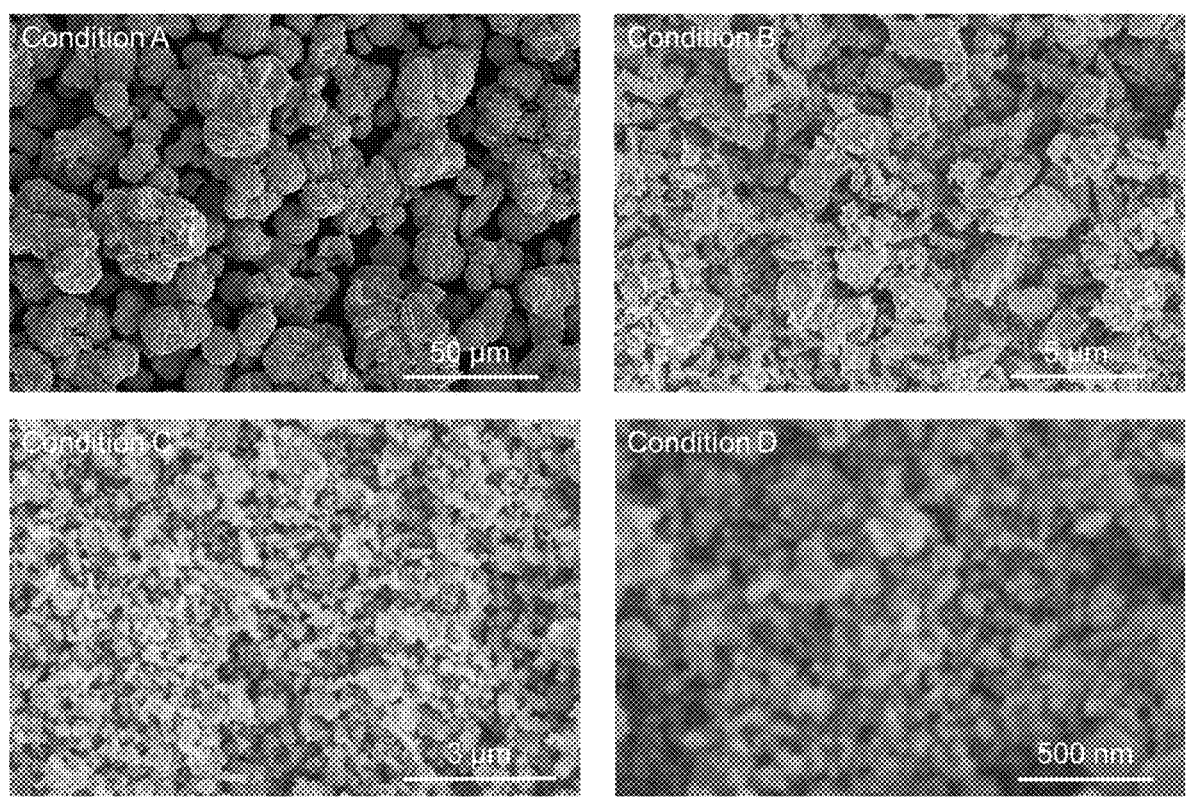
FIG. 1 are diagrams showing a different particle size in sodium tin oxide ($Na_xSnO_y$) prepared using mechanical milling. Particle sizes ranging from 0.01 µm to 50 µm are displayed.

Hereinafter, the present disclosure will be described in detail. Prior to the description, it should be understood that the terms or words used in the specification and the appended claims should not be construed as limited to general and dictionary meanings, but rather interpreted based on the meanings and concepts corresponding to the technical aspects of the present disclosure on the basis of the principle that the inventor is allowed to define terms appropriately for the best explanation. Therefore, the embodiments described herein and the elements shown in the drawings is just a most preferred embodiment of the present disclosure, but not intended to fully describe the technical aspects of the present disclosure, so it should be understood that other equivalents and modifications could have been made thereto at the time the application was filed.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

The terms "about" and "essentially" are used herein in the sense of at, or nearly at, when given the manufacturing and material tolerances inherent in the stated circumstances and are used to prevent the unscrupulous infringer from unfairly taking advantage of the present disclosure where exact or absolute figures are stated as an aid to understanding the present disclosure.

"A and/or B" when used in this specification, specifies "either A or B or both".

When hard carbon is used for the negative electrode, the life characteristics are long, but volumetric energy density is low due to the low density of carbon based materials, resulting in poor competitive advantages for sodium secondary batteries. The present disclosure recognizes that high capacity negative electrode active material such as tin (Sn) can replace the hard carbon-based negative electrode active material in high performance batteries, such as sodium battery. Tin (Sn) has high electrical conductivity and exhibits higher capacity characteristics than the hard carbon-based active material, additionally, it has a much higher density compared to carbon. So, when tin (Sn) is applied as the negative electrode active material, it is possible to achieve higher battery capacity and smaller battery size than the existing batteries including the hard carbon-based negative electrode.

The present disclosure also recognizes that tin (Sn) exhibits a low first cycle reversible coulombic efficiency, along with poor capacity retention as it is continuously charged and discharged during battery operation. This is a consequence of its continuous consumption of sodium reservoir, along with the multiple phase changes in its crystal structure during charge and discharge, resulting in the reduced battery capacity. Similar to its lithium analogous counterpart, silicon alloys that undergo large volume expansion during lithium-silicon alloy formation, the sodium-tin alloy also undergoes transition from one crystalline phase to another, resulting in even larger volume changes and poorer reversibility.

Furthermore, the present disclosure recognizes that volume change and/or poor reversibility can be mitigated using the sodium tin oxide compound, composition and composite material disclosed herein, significantly improving its reversibility.

Provided in certain embodiments herein are systems and processes for manufacturing electrode materials and/or electrodes (e.g., thin layer electrode depositions, such as on a current collector), and other depositions comprising the components described herein. In some embodiments, the electrode comprises an active electrode material (e.g., a silicon-containing material) and carbonaceous material (e.g., a nanostructured carbon) (e.g., a graphene component, such as reduced graphene oxide).

The present disclosure relates to a sodium secondary battery comprising a solid or liquid electrolyte material as an electrolyte. Specific examples of the sodium secondary battery include any type of primary battery, secondary battery, fuel cell, solar cell or capacitor such as a super capacitor. In particular, the secondary battery is, to be specific, a sodium ion secondary battery.

In an embodiment, the sodium secondary battery according to the present disclosure comprises a negative electrode, a positive electrode and a solid/liquid electrolyte connected between the negative electrode and the positive electrode, and the negative electrode comprises a negative electrode active material layer including sodium tin oxide ($Na_xSnO_y$) as a negative electrode active material. In some embodiments, the tin oxide is in contact with the sodium metal in the presence of a liquid electrolyte, and wherein optionally the tin oxide is coated on a current collector.

Hereinafter, the compound, composition, composite material, electrode, battery, and technical effects of the present disclosure will be described in detail.

Sodium Tin Oxide Compound

According to one aspect of the present disclosure, provided in certain embodiments herein are compounds having a chemical formula of NaxSnOy, wherein x is no more than 5.0, and wherein y is less than 2.0.

In some embodiments, y is from 0.1 to 1.9. In some embodiments, y is from 0.3 to 1.7. In some embodiments, y is from 0.5 to 1.5. In some embodiments, y is from 0.7 to 1.3. In some embodiments, y is from 0.9 to 1.1. In some embodiments, y is about 1.0.

In some embodiments, y is from 0.1 to 1.9. In some embodiments, y is from 0.2 to 1.9. In some embodiments, y is from 0.3 to 1.9. In some embodiments, y is from 0.4 to 1.9. In some embodiments, y is from 0.5 to 1.9. In some embodiments, y is from 0.6 to 1.9. In some embodiments, y is from 0.7 to 1.9. In some embodiments, y is from 0.8 to 1.9. In some embodiments, y is from 0.9 to 1.9. In some embodiments, y is from 1.0 to 1.9. In some embodiments, y is from 1.1 to 1.9. In some embodiments, y is from 1.2 to 1.9. In some embodiments, y is from 1.3 to 1.9. In some embodiments, y is from 1.4 to 1.9. In some embodiments, y is from 1.5 to 1.9. In some embodiments, y is from 1.6 to 1.9. In some embodiments, y is from 1.7 to 1.9. In some embodiments, y is from 1.8 to 1.9.

In some embodiments, y is from 0.1 to 1.8. In some embodiments, y is from 0.2 to 1.8. In some embodiments, y is from 0.3 to 1.8. In some embodiments, y is from 0.4 to 1.8. In some embodiments, y is from 0.5 to 1.8. In some embodiments, y is from 0.6 to 1.8. In some embodiments, y is from 0.7 to 1.8. In some embodiments, y is from 0.8 to 1.8. In some embodiments, y is from 0.9 to 1.8. In some embodiments, y is from 1.0 to 1.8. In some embodiments, y is from 1.1 to 1.8. In some embodiments, y is from 1.2 to 1.8. In some embodiments, y is from 1.3 to 1.8. In some embodiments, y is from 1.4 to 1.8. In some embodiments, y is from 1.5 to 1.8. In some embodiments, y is from 1.6 to 1.8. In some embodiments, y is from 1.7 to 1.8.

In some embodiments, y is from 0.1 to 1.7. In some embodiments, y is from 0.2 to 1.7. In some embodiments, y is from 0.3 to 1.7. In some embodiments, y is from 0.4 to 1.7. In some embodiments, y is from 0.5 to 1.7. In some embodiments, y is from 0.6 to 1.7. In some embodiments, y is from 0.7 to 1.7. In some embodiments, y is from 0.8 to 1.7. In some embodiments, y is from 0.9 to 1.7. In some embodiments, y is from 1.0 to 1.7. In some embodiments, y is from 1.1 to 1.7. In some embodiments, y is from 1.2 to 1.7. In some embodiments, y is from 1.3 to 1.7. In some embodiments, y is from 1.4 to 1.7. In some embodiments, y is from 1.5 to 1.7. In some embodiments, y is from 1.6 to 1.7.

In some embodiments, y is from 0.1 to 1.6. In some embodiments, y is from 0.2 to 1.6. In some embodiments, y is from 0.3 to 1.6. In some embodiments, y is from 0.4 to 1.6. In some embodiments, y is from 0.5 to 1.6. In some embodiments, y is from 0.6 to 1.6. In some embodiments, y is from 0.7 to 1.6. In some embodiments, y is from 0.8 to 1.6. In some embodiments, y is from 0.9 to 1.6. In some embodiments, y is from 1.0 to 1.6. In some embodiments, y is from 1.1 to 1.6. In some embodiments, y is from 1.2 to 1.6. In some embodiments, y is from 1.3 to 1.6. In some embodiments, y is from 1.4 to 1.6. In some embodiments, y is from 1.5 to 1.6.

In some embodiments, y is from 0.1 to 1.5. In some embodiments, y is from 0.2 to 1.5. In some embodiments, y is from 0.3 to 1.5. In some embodiments, y is from 0.4 to 1.5. In some embodiments, y is from 0.5 to 1.5. In some embodiments, y is from 0.6 to 1.5. In some embodiments, y is from 0.7 to 1.5. In some embodiments, y is from 0.8 to 1.5. In some embodiments, y is from 0.9 to 1.5. In some embodiments, y is from 1.0 to 1.5. In some embodiments, y is from 1.1 to 1.5. In some embodiments, y is from 1.2 to 1.5. In some embodiments, y is from 1.3 to 1.5. In some embodiments, y is from 1.4 to 1.5.

In some embodiments, y is from 0.1 to 1.4. In some embodiments, y is from 0.2 to 1.4. In some embodiments, y is from 0.3 to 1.4. In some embodiments, y is from 0.4 to 1.4. In some embodiments, y is from 0.5 to 1.4. In some embodiments, y is from 0.6 to 1.4. In some embodiments, y is from 0.7 to 1.4. In some embodiments, y is from 0.8 to 1.4. In some embodiments, y is from 0.9 to 1.4. In some embodiments, y is from 1.0 to 1.4. In some embodiments, y is from 1.1 to 1.4. In some embodiments, y is from 1.2 to 1.4. In some embodiments, y is from 1.3 to 1.4.

In some embodiments, y is from 0.1 to 1.3. In some embodiments, y is from 0.2 to 1.3. In some embodiments, y is from 0.3 to 1.3. In some embodiments, y is from 0.4 to 1.3. In some embodiments, y is from 0.5 to 1.3. In some embodiments, y is from 0.6 to 1.3. In some embodiments, y is from 0.7 to 1.3. In some embodiments, y is from 0.8 to 1.3. In some embodiments, y is from 0.9 to 1.3. In some embodiments, y is from 1.0 to 1.3. In some embodiments, y is from 1.1 to 1.3. In some embodiments, y is from 1.2 to 1.3.

In some embodiments, y is from 0.1 to 1.2. In some embodiments, y is from 0.2 to 1.2. In some embodiments, y is from 0.3 to 1.2. In some embodiments, y is from 0.4 to 1.2. In some embodiments, y is from 0.5 to 1.2. In some embodiments, y is from 0.6 to 1.2. In some embodiments, y is from 0.7 to 1.2. In some embodiments, y is from 0.8 to 1.2. In some embodiments, y is from 0.9 to 1.2. In some embodiments, y is from 1.0 to 1.2. In some embodiments, y is from 1.1 to 1.2.

In some embodiments, y is from 0.1 to 1.1. In some embodiments, y is from 0.2 to 1.1. In some embodiments, y is from 0.3 to 1.1. In some embodiments, y is from 0.4 to 1.1. In some embodiments, y is from 0.5 to 1.1. In some embodiments, y is from 0.6 to 1.1. In some embodiments, y is from 0.7 to 1.1. In some embodiments, y is from 0.8 to 1.1. In some embodiments, y is from 0.9 to 1.1. In some embodiments, y is from 1.0 to 1.1.

In some embodiments, y is from 0.1 to 1.0. In some embodiments, y is from 0.2 to 1.0. In some embodiments, y is from 0.3 to 1.0. In some embodiments, y is from 0.4 to 1.0. In some embodiments, y is from 0.5 to 1.0. In some embodiments, y is from 0.6 to 1.0. In some embodiments, y is from 0.7 to 1.0. In some embodiments, y is from 0.8 to 1.0. In some embodiments, y is from 0.9 to 1.0.

In some embodiments, y is from 0.1 to 0.9. In some embodiments, y is from 0.2 to 0.9. In some embodiments, y is from 0.3 to 0.9. In some embodiments, y is from 0.4 to 0.9. In some embodiments, y is from 0.5 to 0.9. In some embodiments, y is from 0.6 to 0.9. In some embodiments, y is from 0.7 to 0.9. In some embodiments, y is from 0.8 to 0.9.

In some embodiments, y is from 0.1 to 0.9. In some embodiments, y is from 0.2 to 0.9. In some embodiments, y is from 0.3 to 0.9. In some embodiments, y is from 0.4 to 0.9. In some embodiments, y is from 0.5 to 0.9. In some embodiments, y is from 0.6 to 0.9. In some embodiments, y is from 0.7 to 0.9. In some embodiments, y is from 0.8 to 0.9.

In some embodiments, y is from 0.1 to 0.8. In some embodiments, y is from 0.2 to 0.8. In some embodiments, y is from 0.3 to 0.8. In some embodiments, y is from 0.4 to 0.8. In some embodiments, y is from 0.5 to 0.8. In some embodiments, y is from 0.6 to 0.8. In some embodiments, y is from 0.7 to 0.8.

In some embodiments, y is from 0.1 to 0.7. In some embodiments, y is from 0.2 to 0.7. In some embodiments, y is from 0.3 to 0.7. In some embodiments, y is from 0.4 to 0.7. In some embodiments, y is from 0.5 to 0.7. In some embodiments, y is from 0.6 to 0.7.

In some embodiments, y is from 0.1 to 0.6. In some embodiments, y is from 0.2 to 0.6. In some embodiments, y is from 0.3 to 0.6. In some embodiments, y is from 0.4 to 0.6. In some embodiments, y is from 0.5 to 0.6.

In some embodiments, y is from 0.1 to 0.5. In some embodiments, y is from 0.2 to 0.5. In some embodiments, y is from 0.3 to 0.5. In some embodiments, y is from 0.4 to 0.5.

In some embodiments, y is from 0.1 to 0.4. In some embodiments, y is from 0.2 to 0.4. In some embodiments, y is from 0.3 to 0.4.

In some embodiments, y is from 0.1 to 0.3. In some embodiments, y is from 0.2 to 0.3. In some embodiments, y is from 0.1 to 0.2.

In some embodiments, x is from 0.1 to 5.0. In some embodiments, x is from 0.1 to 3.75. In some embodiments, x is from 0.3 to 3.5. In some embodiments, x is from 0.5 to 3.0. In some embodiments, x is from 0.8 to 2.8. In some embodiments, x is about 1.2. In some embodiments, x is about 1.8. In some embodiments, x is about 2.4.

In some embodiments, x is from 0.1 to 5.0. In some embodiments, x is from 0.3 to 5.0. In some embodiments, x is from 0.5 to 5.0. In some embodiments, x is from 0.8 to 5.0. In some embodiments, x is from 1.0 to 5.0. In some embodiments, x is from 1.2 to 5.0. In some embodiments, x is from 1.5 to 5.0. In some embodiments, x is from 1.8 to 5.0. In some embodiments, x is from 2.1 to 5.0. In some embodiments, x is from 2.4 to 5.0. In some embodiments, x is from 2.7 to 5.0. In some embodiments, x is from 3.0 to 5.0. In some embodiments, x is from 3.75 to 5.0. In some embodiments, x is from 4.5 to 5.0.

In some embodiments, x is from 0.1 to 4.5. In some embodiments, x is from 0.3 to 4.5. In some embodiments, x is from 0.5 to 4.5. In some embodiments, x is from 0.8 to 4.5. In some embodiments, x is from 1.0 to 4.5. In some embodiments, x is from 1.2 to 4.5. In some embodiments, x is from 1.5 to 4.5. In some embodiments, x is from 1.8 to 4.5. In some embodiments, x is from 2.1 to 4.5. In some embodiments, x is from 2.4 to 4.5. In some embodiments, x is from 2.7 to 4.5. In some embodiments, x is from 3.0 to 4.5. In some embodiments, x is from 3.75 to 4.5.

In some embodiments, x is from 0.1 to 3.75. In some embodiments, x is from 0.3 to 3.75. In some embodiments, x is from 0.5 to 3.75. In some embodiments, x is from 0.8 to 3.75. In some embodiments, x is from 1.0 to 3.75. In some embodiments, x is from 1.2 to 3.75. In some embodiments, x is from 1.5 to 3.75. In some embodiments, x is from 1.8 to 3.75. In some embodiments, x is from 2.1 to 3.75. In some embodiments, x is from 2.4 to 3.75. In some embodiments, x is from 2.7 to 3.75. In some embodiments, x is from 3.0 to 3.75.

In some embodiments, x is from 0.1 to 3.0. In some embodiments, x is from 0.3 to 3.0. In some embodiments, x is from 0.5 to 3.0. In some embodiments, x is from 0.8 to 3.0. In some embodiments, x is from 1.0 to 3.0. In some embodiments, x is from 1.2 to 3.0. In some embodiments, x is from 1.5 to 3.0. In some embodiments, x is from 1.8 to 3.0. In some embodiments, x is from 2.1 to 3.0. In some embodiments, x is from 2.4 to 3.0. In some embodiments, x is from 2.7 to 3.0.

In some embodiments, x is from 0.1 to 2.7. In some embodiments, x is from 0.3 to 2.7. In some embodiments, x is from 0.5 to 2.7. In some embodiments, x is from 0.8 to 2.7. In some embodiments, x is from 1.0 to 2.7. In some embodiments, x is from 1.2 to 2.7. In some embodiments, x is from 1.5 to 2.7. In some embodiments, x is from 1.8 to 2.7. In some embodiments, x is from 2.1 to 2.7. In some embodiments, x is from 2.4 to 2.7.

In some embodiments, x is from 0.1 to 2.4. In some embodiments, x is from 0.3 to 2.4. In some embodiments, x is from 0.5 to 2.4. In some embodiments, x is from 0.8 to 2.4. In some embodiments, x is from 1.0 to 2.4. In some embodiments, x is from 1.2 to 2.4. In some embodiments, x is from 1.5 to 2.4. In some embodiments, x is from 1.8 to 2.4. In some embodiments, x is from 2.1 to 2.4.

In some embodiments, x is from 0.1 to 2.1. In some embodiments, x is from 0.3 to 2.1. In some embodiments, x is from 0.5 to 2.1. In some embodiments, x is from 0.8 to 2.1. In some embodiments, x is from 1.0 to 2.1. In some embodiments, x is from 1.2 to 2.1. In some embodiments, x is from 1.5 to 2.1. In some embodiments, x is from 1.8 to 2.1.

In some embodiments, x is from 0.1 to 1.8. In some embodiments, x is from 0.3 to 1.8. In some embodiments, x is from 0.5 to 1.8. In some embodiments, x is from 0.8 to 1.8. In some embodiments, x is from 1.0 to 1.8. In some embodiments, x is from 1.2 to 1.8. In some embodiments, x is from 1.5 to 1.8.

In some embodiments, x is from 0.1 to 1.5. In some embodiments, x is from 0.3 to 1.5. In some embodiments, x is from 0.5 to 1.5. In some embodiments, x is from 0.8 to 1.5. In some embodiments, x is from 1.0 to 1.5. In some embodiments, x is from 1.2 to 1.5.

In some embodiments, x is from 0.1 to 1.2. In some embodiments, x is from 0.3 to 1.2. In some embodiments, x is from 0.5 to 1.2. In some embodiments, x is from 0.8 to 1.2. In some embodiments, x is from 1.0 to 1.2.

In some embodiments, x is from 0.1 to 1.0. In some embodiments, x is from 0.3 to 1.0. In some embodiments, x is from 0.5 to 1.0. In some embodiments, x is from 0.8 to 1.0.

In some embodiments, x is from 0.1 to 0.8. In some embodiments, x is from 0.3 to 0.8. In some embodiments, x is from 0.5 to 0.8.

In some embodiments, x is from 0.1 to 0.5. In some embodiments, x is from 0.3 to 0.5. In some embodiments, x is from 0.1 to 0.3.

Sodium Tin Oxide Composition and Composite Material

According to one aspect of the present disclosure, provided in certain embodiments herein are compositions consisting essentially of sodium (Na), tin (Sn), and oxygen (O), wherein a molar ratio between Sn and O is less than 2.0.

According to one aspect of the present disclosure, provided in certain embodiments herein are composite materials formed by contacting tin oxide with a reducing agent or by electrochemically reducing tin oxide, wherein a molar ratio between O and Sn in the composite material is less than 2.0. In some embodiments, the reducing agent is sodium metal. In some embodiments, the sodium metal is combined with tin oxide in a melt reaction vessel, and optionally further ball milled with a milling media, to form the composite material. In some embodiments, the tin oxide is in contact with the sodium metal in the presence of an electrolyte, and wherein optionally the tin oxide is coated on a current collector. In some embodiments, the reducing agent is an organic sodium salt. In some embodiments, the organic sodium salt is sodium biphenyl, sodium naphthalene, or combination thereof. In some embodiments, the composite material is formed by electrochemically reducing tin oxide by a sodium based counter electrode. In some embodiments, the sodium based counter electrode comprise a counter electrode material selected from the group consisting of sodium metal, sodium transition metal oxides, sodium peroxides, sodium carbonate, sodium oxide, sodium nitrate, sodium nitride, sodium organic salts, and combinations thereof.

In some embodiments, the molar ratio between O and Sn is from 0.1 to 1.9. In some embodiments, the molar ratio between O and Sn is from 0.3 to 1.7. In some embodiments, the molar ratio between O and Sn is from 0.5 to 1.5. In some embodiments, the molar ratio between O and Sn is from 0.7 to 1.3. In some embodiments, the molar ratio between O and Sn is from 0.9 to 1.1. In some embodiments, the molar ratio between O and Sn is about 1.0.

In some embodiments, the molar ratio between O and Sn is from 0.1 to 1.9. In some embodiments, the molar ratio between O and Sn is from 0.2 to 1.9. In some embodiments, the molar ratio between O and Sn is from 0.3 to 1.9. In some embodiments, the molar ratio between O and Sn is from 0.4 to 1.9. In some embodiments, the molar ratio between O and Sn is from 0.5 to 1.9. In some embodiments, the molar ratio between O and Sn is from 0.6 to 1.9. In some embodiments, the molar ratio between O and Sn is from 0.7 to 1.9. In some embodiments, the molar ratio between O and Sn is from 0.8 to 1.9. In some embodiments, the molar ratio between O and Sn is from 0.9 to 1.9. In some embodiments, the molar ratio between O and Sn is from 1.0 to 1.9. In some embodiments, the molar ratio between O and Sn is from 1.1 to 1.9. In some embodiments, the molar ratio between O and Sn is from 1.2 to 1.9. In some embodiments, the molar ratio between O and Sn is from 1.3 to 1.9. In some embodiments, the molar ratio between O and Sn is from 1.4 to 1.9. In some embodiments, the molar ratio between O and Sn is from 1.5 to 1.9. In some embodiments, the molar ratio between O and Sn is from 1.6 to 1.9. In some embodiments, the molar ratio between O and Sn is from 1.7 to 1.9. In some embodiments, the molar ratio between 0 and Sn is from 1.8 to 1.9.

In some embodiments, the molar ratio between O and Sn is from 0.1 to 1.8. In some embodiments, the molar ratio between O and Sn is from 0.2 to 1.8. In some embodiments, the molar ratio between O and Sn is from 0.3 to 1.8. In some embodiments, the molar ratio between O and Sn is from 0.4 to 1.8. In some embodiments, the molar ratio between O and Sn is from 0.5 to 1.8. In some embodiments, the molar ratio between O and Sn is from 0.6 to 1.8. In some embodiments, the molar ratio between O and Sn is from 0.7 to 1.8. In some embodiments, the molar ratio between O and Sn is from 0.8 to 1.8. In some embodiments, the molar ratio between O and Sn is from 0.9 to 1.8. In some embodiments, the molar ratio between O and Sn is from 1.0 to 1.8. In some embodiments, the molar ratio between O and Sn is from 1.1 to 1.8. In some embodiments, the molar ratio between O and Sn is from 1.2 to 1.8. In some embodiments, the molar ratio between O and Sn is from 1.3 to 1.8. In some embodiments, the molar ratio between O and Sn is from 1.4 to 1.8. In some embodiments, the molar ratio between O and Sn is from 1.5 to 1.8. In some embodiments, the molar ratio between O and Sn is from 1.6 to 1.8. In some embodiments, the molar ratio between O and Sn is from 1.7 to 1.8.

In some embodiments, the molar ratio between O and Sn is from 0.1 to 1.7. In some embodiments, the molar ratio between O and Sn is from 0.2 to 1.7. In some embodiments, the molar ratio between O and Sn is from 0.3 to 1.7. In some embodiments, the molar ratio between O and Sn is from 0.4 to 1.7. In some embodiments, the molar ratio between O and Sn is from 0.5 to 1.7. In some embodiments, the molar ratio between O and Sn is from 0.6 to 1.7. In some embodiments, the molar ratio between O and Sn is from 0.7 to 1.7. In some embodiments, the molar ratio between O and Sn is from 0.8 to 1.7. In some embodiments, the molar ratio between O and Sn is from 0.9 to 1.7. In some embodiments, the molar ratio between O and Sn is from 1.0 to 1.7. In some embodiments, the molar ratio between O and Sn is from 1.1 to 1.7. In some embodiments, the molar ratio between O and Sn is from 1.2 to 1.7. In some embodiments, the molar ratio between O and Sn is from 1.3 to 1.7. In some embodiments, the molar ratio between O and Sn is from 1.4 to 1.7. In some embodiments, the molar ratio between O and Sn is from 1.5 to 1.7. In some embodiments, the molar ratio between O and Sn is from 1.6 to 1.7.

In some embodiments, the molar ratio between O and Sn is from 0.1 to 1.6. In some embodiments, the molar ratio between O and Sn is from 0.2 to 1.6. In some embodiments, the molar ratio between O and Sn is from 0.3 to 1.6. In some embodiments, the molar ratio between O and Sn is from 0.4 to 1.6. In some embodiments, the molar ratio between O and Sn is from 0.5 to 1.6. In some embodiments, the molar ratio between O and Sn is from 0.6 to 1.6. In some embodiments, the molar ratio between O and Sn is from 0.7 to 1.6. In some embodiments, the molar ratio between O and Sn is from 0.8 to 1.6. In some embodiments, the molar ratio between O and Sn is from 0.9 to 1.6. In some embodiments, the molar ratio between O and Sn is from 1.0 to 1.6. In some embodiments, the molar ratio between O and Sn is from 1.1 to 1.6. In some embodiments, the molar ratio between O and Sn is from 1.2 to 1.6. In some embodiments, the molar ratio between O and Sn is from 1.3 to 1.6. In some embodiments, the molar ratio between O and Sn is from 1.4 to 1.6. In some embodiments, the molar ratio between O and Sn is from 1.5 to 1.6.

In some embodiments, the molar ratio between O and Sn is from 0.1 to 1.5. In some embodiments, the molar ratio between O and Sn is from 0.2 to 1.5. In some embodiments, the molar ratio between O and Sn is from 0.3 to 1.5. In some embodiments, the molar ratio between O and Sn is from 0.4 to 1.5. In some embodiments, the molar ratio between O and Sn is from 0.5 to 1.5. In some embodiments, the molar ratio between O and Sn is from 0.6 to 1.5. In some embodiments, the molar ratio between O and Sn is from 0.7 to 1.5. In some embodiments, the molar ratio between O and Sn is from 0.8 to 1.5. In some embodiments, the molar ratio between O and Sn is from 0.9 to 1.5. In some embodiments, the molar ratio between O and Sn is from 1.0 to 1.5. In some embodiments, the molar ratio between O and Sn is from 1.1 to 1.5. In some embodiments, the molar ratio between O and Sn is from 1.2 to 1.5. In some embodiments, the molar ratio between O and Sn is from 1.3 to 1.5. In some embodiments, the molar ratio between O and Sn is from 1.4 to 1.5.

In some embodiments, the molar ratio between O and Sn is from 0.1 to 1.4. In some embodiments, the molar ratio between O and Sn is from 0.2 to 1.4. In some embodiments, the molar ratio between O and Sn is from 0.3 to 1.4. In some embodiments, the molar ratio between O and Sn is from 0.4 to 1.4. In some embodiments, the molar ratio between O and Sn is from 0.5 to 1.4. In some embodiments, the molar ratio between O and Sn is from 0.6 to 1.4. In some embodiments, the molar ratio between O and Sn is from 0.7 to 1.4. In some embodiments, the molar ratio between O and Sn is from 0.8 to 1.4. In some embodiments, the molar ratio between O and Sn is from 0.9 to 1.4. In some embodiments, the molar ratio between O and Sn is from 1.0 to 1.4. In some embodiments, the molar ratio between O and Sn is from 1.1 to 1.4. In some embodiments, the molar ratio between O and Sn is from 1.2 to 1.4. In some embodiments, the molar ratio between 0 and Sn is from 1.3 to 1.4.

In some embodiments, the molar ratio between O and Sn is from 0.1 to 1.3. In some embodiments, the molar ratio between O and Sn is from 0.2 to 1.3. In some embodiments, the molar ratio between O and Sn is from 0.3 to 1.3. In some embodiments, the molar ratio between O and Sn is from 0.4 to 1.3. In some embodiments, the molar ratio between O and Sn is from 0.5 to 1.3. In some embodiments, the molar ratio between O and Sn is from 0.6 to 1.3. In some embodiments, the molar ratio between O and Sn is from 0.7 to 1.3. In some embodiments, the molar ratio between O and Sn is from 0.8 to 1.3. In some embodiments, the molar ratio between O and Sn is from 0.9 to 1.3. In some embodiments, the molar ratio between O and Sn is from 1.0 to 1.3. In some embodiments, the molar ratio between O and Sn is from 1.1 to 1.3. In some embodiments, the molar ratio between O and Sn is from 1.2 to 1.3.

In some embodiments, the molar ratio between O and Sn is from 0.1 to 1.2. In some embodiments, the molar ratio between O and Sn is from 0.2 to 1.2. In some embodiments, the molar ratio between O and Sn is from 0.3 to 1.2. In some embodiments, the molar ratio between O and Sn is from 0.4 to 1.2. In some embodiments, the molar ratio between O and Sn is from 0.5 to 1.2. In some embodiments, the molar ratio between O and Sn is from 0.6 to 1.2. In some embodiments, the molar ratio between O and Sn is from 0.7 to 1.2. In some embodiments, the molar ratio between O and Sn is from 0.8 to 1.2. In some embodiments, the molar ratio between O and Sn is from 0.9 to 1.2. In some embodiments, the molar ratio between O and Sn is from 1.0 to 1.2. In some embodiments, the molar ratio between O and Sn is from 1.1 to 1.2.

In some embodiments, the molar ratio between O and Sn is from 0.1 to 1.1. In some embodiments, the molar ratio between O and Sn is from 0.2 to 1.1. In some embodiments, the molar ratio between O and Sn is from 0.3 to 1.1. In some embodiments, the molar ratio between O and Sn is from 0.4 to 1.1. In some embodiments, the molar ratio between O and Sn is from 0.5 to 1.1. In some embodiments, the molar ratio between O and Sn is from 0.6 to 1.1. In some embodiments, the molar ratio between O and Sn is from 0.7 to 1.1. In some embodiments, the molar ratio between O and Sn is from 0.8 to 1.1. In some embodiments, the molar ratio between O and Sn is from 0.9 to 1.1. In some embodiments, the molar ratio between O and Sn is from 1.0 to 1.1.

In some embodiments, the molar ratio between O and Sn is from 0.1 to 1.0. In some embodiments, the molar ratio between O and Sn is from 0.2 to 1.0. In some embodiments, the molar ratio between O and Sn is from 0.3 to 1.0. In some embodiments, the molar ratio between O and Sn is from 0.4 to 1.0. In some embodiments, the molar ratio between O and Sn is from 0.5 to 1.0. In some embodiments, the molar ratio between O and Sn is from 0.6 to 1.0. In some embodiments, the molar ratio between O and Sn is from 0.7 to 1.0. In some embodiments, the molar ratio between O and Sn is from 0.8 to 1.0. In some embodiments, the molar ratio between O and Sn is from 0.9 to 1.0.

In some embodiments, the molar ratio between O and Sn is from 0.1 to 0.9. In some embodiments, the molar ratio between O and Sn is from 0.2 to 0.9. In some embodiments, the molar ratio between O and Sn is from 0.3 to 0.9. In some embodiments, the molar ratio between O and Sn is from 0.4 to 0.9. In some embodiments, the molar ratio between O and Sn is from 0.5 to 0.9. In some embodiments, the molar ratio between O and Sn is from 0.6 to 0.9. In some embodiments, the molar ratio between O and Sn is from 0.7 to 0.9. In some embodiments, the molar ratio between 0 and Sn is from 0.8 to 0.9.

In some embodiments, the molar ratio between O and Sn is from 0.1 to 0.9. In some embodiments, the molar ratio between O and Sn is from 0.2 to 0.9. In some embodiments, the molar ratio between O and Sn is from 0.3 to 0.9. In some embodiments, the molar ratio between O and Sn is from 0.4 to 0.9. In some embodiments, the molar ratio between O and Sn is from 0.5 to 0.9. In some embodiments, the molar ratio between O and Sn is from 0.6 to 0.9. In some embodiments, the molar ratio between O and Sn is from 0.7 to 0.9. In some embodiments, the molar ratio between 0 and Sn is from 0.8 to 0.9.

In some embodiments, the molar ratio between O and Sn is from 0.1 to 0.8. In some embodiments, the molar ratio between O and Sn is from 0.2 to 0.8. In some embodiments, the molar ratio between O and Sn is from 0.3 to 0.8. In some embodiments, the molar ratio between O and Sn is from 0.4 to 0.8. In some embodiments, the molar ratio between O and Sn is from 0.5 to 0.8. In some embodiments, the molar ratio between O and Sn is from 0.6 to 0.8. In some embodiments, the molar ratio between O and Sn is from 0.7 to 0.8.

In some embodiments, the molar ratio between O and Sn is from 0.1 to 0.7. In some embodiments, the molar ratio between O and Sn is from 0.2 to 0.7. In some embodiments, the molar ratio between O and Sn is from 0.3 to 0.7. In some embodiments, the molar ratio between O and Sn is from 0.4 to 0.7. In some embodiments, the molar ratio between O and Sn is from 0.5 to 0.7. In some embodiments, the molar ratio between O and Sn is from 0.6 to 0.7.

In some embodiments, the molar ratio between O and Sn is from 0.1 to 0.6. In some embodiments, the molar ratio between O and Sn is from 0.2 to 0.6. In some embodiments, the molar ratio between O and Sn is from 0.3 to 0.6. In some embodiments, the molar ratio between O and Sn is from 0.4 to 0.6. In some embodiments, the molar ratio between O and Sn is from 0.5 to 0.6.

In some embodiments, the molar ratio between O and Sn is from 0.1 to 0.5. In some embodiments, the molar ratio between O and Sn is from 0.2 to 0.5. In some embodiments, the molar ratio between O and Sn is from 0.3 to 0.5. In some embodiments, the molar ratio between O and Sn is from 0.4 to 0.5.

In some embodiments, the molar ratio between O and Sn is from 0.1 to 0.4. In some embodiments, the molar ratio between O and Sn is from 0.2 to 0.4. In some embodiments, the molar ratio between 0 and Sn is from 0.3 to 0.4.

In some embodiments, the molar ratio between O and Sn is from 0.1 to 0.3. In some embodiments, the molar ratio between O and Sn is from 0.2 to 0.3. In some embodiments, the molar ratio between 0 and Sn is from 0.1 to 0.2.

In some embodiments, a molar ratio between Na and Sn is less than 5.0. In some embodiments, a molar ratio between Na and Sn is from 0.1 to 3.75. In some embodiments, a molar ratio between Na and Sn is from 0.3 to 3.5. In some embodiments, a molar ratio between Na and Sn is from 0.5 to 3.0. In some embodiments, a molar ratio between Na and Sn is from 0.8 to 2.8. In some embodiments, a molar ratio between Na and Sn is about 1.2. In some embodiments, a molar ratio between Na and Sn is about 1.8. In some embodiments, a molar ratio between Na and Sn is about 2.4.

In some embodiments, the molar ratio between Na and Sn is from 0.1 to 5.0. In some embodiments, the molar ratio between Na and Sn is from 0.3 to 5.0. In some embodiments, the molar ratio between Na and Sn is from 0.5 to 5.0. In some embodiments, the molar ratio between Na and Sn is from 0.8 to 5.0. In some embodiments, the molar ratio between Na and Sn is from 1.0 to 5.0. In some embodiments, the molar ratio between Na and Sn is from 1.2 to 5.0. In some embodiments, the molar ratio between Na and Sn is from 1.5 to 5.0. In some embodiments, the molar ratio between Na and Sn is from 1.8 to 5.0. In some embodiments, the molar ratio between Na and Sn is from 2.1 to 5.0. In some embodiments, the molar ratio between Na and Sn is from 2.4 to 5.0. In some embodiments, the molar ratio between Na and Sn is from 2.7 to 5.0. In some embodiments, the molar ratio between Na and Sn is from 3.0 to 5.0. In some embodiments, the molar ratio between Na and Sn is from 3.75 to 5.0. In some embodiments, the molar ratio between Na and Sn is from 4.5 to 5.0.

In some embodiments, the molar ratio between Na and Sn is from 0.1 to 4.5. In some embodiments, the molar ratio between Na and Sn is from 0.3 to 4.5. In some embodiments, the molar ratio between Na and Sn is from 0.5 to 4.5. In some embodiments, the molar ratio between Na and Sn is from 0.8 to 4.5. In some embodiments, the molar ratio between Na and Sn is from 1.0 to 4.5. In some embodiments, the molar ratio between Na and Sn is from 1.2 to 4.5. In some embodiments, the molar ratio between Na and Sn is from 1.5 to 4.5. In some embodiments, the molar ratio between Na and Sn is from 1.8 to 4.5. In some embodiments, the molar ratio between Na and Sn is from 2.1 to 4.5. In some embodiments, the molar ratio between Na and Sn is from 2.4 to 4.5. In some embodiments, the molar ratio between Na and Sn is from 2.7 to 4.5. In some embodiments, the molar ratio between Na and Sn is from 3.0 to 4.5. In some embodiments, the molar ratio between Na and Sn is from 3.75 to 4.5.

In some embodiments, the molar ratio between Na and Sn is from 0.1 to 3.75. In some embodiments, the molar ratio between Na and Sn is from 0.3 to 3.75. In some embodiments, the molar ratio between Na and Sn is from 0.5 to 3.75. In some embodiments, the molar ratio between Na and Sn is from 0.8 to 3.75. In some embodiments, the molar ratio between Na and Sn is from 1.0 to 3.75. In some embodiments, the molar ratio between Na and Sn is from 1.2 to 3.75. In some embodiments, the molar ratio between Na and Sn is from 1.5 to 3.75. In some embodiments, the molar ratio between Na and Sn is from 1.8 to 3.75. In some embodiments, the molar ratio between Na and Sn is from 2.1 to 3.75. In some embodiments, the molar ratio between Na and Sn is from 2.4 to 3.75. In some embodiments, the molar ratio between Na and Sn is from 2.7 to 3.75. In some embodiments, the molar ratio between Na and Sn is from 3.0 to 3.75.

In some embodiments, the molar ratio between Na and Sn is from 0.1 to 3.0. In some embodiments, the molar ratio between Na and Sn is from 0.3 to 3.0. In some embodiments, the molar ratio between Na and Sn is from 0.5 to 3.0. In some embodiments, the molar ratio between Na and Sn is from 0.8 to 3.0. In some embodiments, the molar ratio between Na and Sn is from 1.0 to 3.0. In some embodiments, the molar ratio between Na and Sn is from 1.2 to 3.0. In some embodiments, the molar ratio between Na and Sn is from 1.5 to 3.0. In some embodiments, the molar ratio between Na and Sn is from 1.8 to 3.0. In some embodiments, the molar ratio between Na and Sn is from 2.1 to 3.0. In some embodiments, the molar ratio between Na and Sn is from 2.4 to 3.0. In some embodiments, the molar ratio between Na and Sn is from 2.7 to 3.0.

In some embodiments, the molar ratio between Na and Sn is from 0.1 to 2.7. In some embodiments, the molar ratio between Na and Sn is from 0.3 to 2.7. In some embodiments, the molar ratio between Na and Sn is from 0.5 to 2.7. In some embodiments, the molar ratio between Na and Sn is from 0.8 to 2.7. In some embodiments, the molar ratio between Na and Sn is from 1.0 to 2.7. In some embodiments, the molar ratio between Na and Sn is from 1.2 to 2.7. In some embodiments, the molar ratio between Na and Sn is from 1.5 to 2.7. In some embodiments, the molar ratio between Na and Sn is from 1.8 to 2.7. In some embodiments, the molar ratio between Na and Sn is from 2.1 to 2.7. In some embodiments, the molar ratio between Na and Sn is from 2.4 to 2.7.

In some embodiments, the molar ratio between Na and Sn is from 0.1 to 2.4. In some embodiments, the molar ratio between Na and Sn is from 0.3 to 2.4. In some embodiments, the molar ratio between Na and Sn is from 0.5 to 2.4. In some embodiments, the molar ratio between Na and Sn is from 0.8 to 2.4. In some embodiments, the molar ratio between Na and Sn is from 1.0 to 2.4. In some embodiments, the molar ratio between Na and Sn is from 1.2 to 2.4. In some embodiments, the molar ratio between Na and Sn is from 1.5 to 2.4. In some embodiments, the molar ratio between Na and Sn is from 1.8 to 2.4. In some embodiments, the molar ratio between Na and Sn is from 2.1 to 2.4.

In some embodiments, the molar ratio between Na and Sn is from 0.1 to 2.1. In some embodiments, the molar ratio between Na and Sn is from 0.3 to 2.1. In some embodiments, the molar ratio between Na and Sn is from 0.5 to 2.1. In some embodiments, the molar ratio between Na and Sn is from 0.8 to 2.1. In some embodiments, the molar ratio between Na and Sn is from 1.0 to 2.1. In some embodiments, the molar ratio between Na and Sn is from 1.2 to 2.1. In some embodiments, the molar ratio between Na and Sn is from 1.5 to 2.1. In some embodiments, the molar ratio between Na and Sn is from 1.8 to 2.1.

In some embodiments, the molar ratio between Na and Sn is from 0.1 to 1.8. In some embodiments, the molar ratio between Na and Sn is from 0.3 to 1.8. In some embodiments, the molar ratio between Na and Sn is from 0.5 to 1.8. In some embodiments, the molar ratio between Na and Sn is from 0.8 to 1.8. In some embodiments, the molar ratio between Na and Sn is from 1.0 to 1.8. In some embodiments, the molar ratio between Na and Sn is from 1.2 to 1.8. In some embodiments, the molar ratio between Na and Sn is from 1.5 to 1.8.

In some embodiments, the molar ratio between Na and Sn is from 0.1 to 1.5. In some embodiments, the molar ratio between Na and Sn is from 0.3 to 1.5. In some embodiments, the molar ratio between Na and Sn is from 0.5 to 1.5. In some embodiments, the molar ratio between Na and Sn is from 0.8 to 1.5. In some embodiments, the molar ratio between Na and Sn is from 1.0 to 1.5. In some embodiments, the molar ratio between Na and Sn is from 1.2 to 1.5.

In some embodiments, the molar ratio between Na and Sn is from 0.1 to 1.2. In some embodiments, the molar ratio between Na and Sn is from 0.3 to 1.2. In some embodiments, the molar ratio between Na and Sn is from 0.5 to 1.2. In some embodiments, the molar ratio between Na and Sn is from 0.8 to 1.2. In some embodiments, the molar ratio between Na and Sn is from 1.0 to 1.2.

In some embodiments, the molar ratio between Na and Sn is from 0.1 to 1.0. In some embodiments, the molar ratio between Na and Sn is from 0.3 to 1.0. In some embodiments, the molar ratio between Na and Sn is from 0.5 to 1.0. In some embodiments, the molar ratio between Na and Sn is from 0.8 to 1.0.

In some embodiments, the molar ratio between Na and Sn is from 0.1 to 0.8. In some embodiments, the molar ratio between Na and Sn is from 0.3 to 0.8. In some embodiments, the molar ratio between Na and Sn is from 0.5 to 0.8.

In some embodiments, the molar ratio between Na and Sn is from 0.1 to 0.5. In some embodiments, the molar ratio between Na and Sn is from 0.3 to 0.5. In some embodiments, the molar ratio between Na and Sn is from 0.1 to 0.3.

In some embodiments, the composition or composite material consists of sodium (Na), tin (Sn), and oxygen (O).

In some embodiments, the composition or composite material is amorphous.

In some embodiments, the composition or composite material is in a form of micro-sized and/or nano-sized particles. In some embodiments, the particles have an average diameter of from about 10 nm to about 50 µm. In some embodiments, the particles have an average diameter of from about 10 nm to about 20 µm. In some embodiments, the particles have an average diameter of from about 50 nm to about 20 µm. In some embodiments, the particles have an average diameter of from about 100 nm to about 20 µm. In some embodiments, the particles have an average diameter of from about 100 nm to about 10 µm. In some embodiments, the particles have an average diameter of from about 500 nm to about 10 µm. In some embodiments, the particles have an average diameter of from about 500 nm to about 5 µm. In some embodiments, the particles have an average diameter of from about 1 µm to about 5 µm.

Electrodes

According to one aspect of the present disclosure, provided in certain embodiments herein are electrodes comprising the compound, the composition, or the composite material disclosed herein. In some embodiments, the electrode is a negative electrode.

In some embodiments, the compound, the composition, or the composite material disclosed herein is present in an active material layer coated over a current collector in the negative electrode.

In some embodiments, the active material layer comprises at least 1 wt % of the compound, the composition, or the composite material disclosed herein. In some embodiments, the active material layer comprises at least 10 wt % of the compound, the composition, or the composite material disclosed herein. In some embodiments, the active material layer comprises at least 20 wt % of the compound, the composition, or the composite material disclosed herein. In some embodiments, the active material layer comprises at least 40 wt % of the compound, the composition, or the composite material disclosed herein. In some embodiments, the active material layer comprises at least 60 wt % of the compound, the composition, or the composite material disclosed herein. In some embodiments, the active material layer comprises at least 80 wt % of the compound, the composition, or the composite material disclosed herein. In some embodiments, the active material layer comprises at least 90 wt % of the compound, the composition, or the composite material disclosed herein.

In some embodiments, the active material layer comprises from 1 wt % to 100 wt % of the compound, the composition, or the composite material disclosed herein. In some embodiments, the active material layer comprises from 10 wt % to 100 wt % of the compound, the composition, or the composite material disclosed herein. In some embodiments, the active material layer comprises from 20 wt % to 100 wt % of the compound, the composition, or the composite material disclosed herein. In some embodiments, the active material layer comprises from 30 wt % to 100 wt % of the compound, the composition, or the composite material disclosed herein. In some embodiments, the active material layer comprises from 40 wt % to 100 wt % of the compound, the composition, or the composite material disclosed herein. In some embodiments, the active material layer comprises from 40 wt % to 100 wt % of the compound, the composition, or the composite material disclosed herein. In some embodiments, the active material layer comprises from 50 wt % to 100 wt % of the compound, the composition, or the composite material disclosed herein. In some embodiments, the active material layer comprises from 60 wt % to 100 wt % of the compound, the composition, or the composite material disclosed herein. In some embodiments, the active material layer comprises from 70 wt % to 100 wt % of the compound, the composition, or the composite material disclosed herein. In some embodiments, the active material layer comprises from 80 wt % to 100 wt % of the compound, the composition, or the composite material disclosed herein. In some embodiments, the active material layer comprises from 90 wt % to 100 wt % of the compound, the composition, or the composite material disclosed herein. In some embodiments, the active material layer comprises from 90 wt % to 100 wt % of the compound, the composition, or the composite material disclosed herein.

In some embodiments, the active material layer comprises from 1 wt % to 90 wt % of the compound, the composition, or the composite material disclosed herein. In some embodiments, the active material layer comprises from 10 wt % to 90 wt % of the compound, the composition, or the composite material disclosed herein. In some embodiments, the active material layer comprises from 20 wt % to 90 wt % of the compound, the composition, or the composite material disclosed herein. In some embodiments, the active material layer comprises from 30 wt % to 90 wt % of the compound, the composition, or the composite material disclosed herein. In some embodiments, the active material layer comprises from 40 wt % to 90 wt % of the compound, the composition, or the composite material disclosed herein. In some embodiments, the active material layer comprises from 40 wt % to 90 wt % of the compound, the composition, or the composite material disclosed herein. In some embodiments, the active material layer comprises from 50 wt % to 90 wt % of the compound, the composition, or the composite material disclosed herein. In some embodiments, the active material layer comprises from 60 wt % to 90 wt % of the compound, the composition, or the composite material disclosed herein. In some embodiments, the active material layer comprises from 70 wt % to 90 wt % of the compound, the composition, or the composite material disclosed herein. In some embodiments, the active material layer comprises from 80 wt % to 90 wt % of the compound, the composition, or the composite material disclosed herein.

In some embodiments, the active material layer comprises from 1 wt % to 80 wt % of the compound, the composition, or the composite material disclosed herein. In some embodiments, the active material layer comprises from 10 wt % to 80 wt % of the compound, the composition, or the composite material disclosed herein. In some embodiments, the active material layer comprises from 20 wt % to 80 wt % of the compound, the composition, or the composite material disclosed herein. In some embodiments, the active material layer comprises from 30 wt % to 80 wt % of the compound, the composition, or the composite material disclosed herein. In some embodiments, the active material layer comprises from 40 wt % to 80 wt % of the compound, the composition, or the composite material disclosed herein. In some embodiments, the active material layer comprises from 40 wt % to 80 wt % of the compound, the composition, or the composite material disclosed herein. In some embodiments, the active material layer comprises from 50 wt % to 80 wt % of the compound, the composition, or the composite material disclosed herein. In some embodiments, the active material layer comprises from 60 wt % to 80 wt % of the compound, the composition, or the composite material disclosed herein. In some embodiments, the active material layer comprises from 70 wt % to 80 wt % of the compound, the composition, or the composite material disclosed herein.

In some embodiments, the active material layer comprises from 1 wt % to 70 wt % of the compound, the composition, or the composite material disclosed herein. In some embodiments, the active material layer comprises from 10 wt % to 70 wt % of the compound, the composition, or the composite material disclosed herein. In some embodiments, the active material layer comprises from 20 wt % to 70 wt % of the compound, the composition, or the composite material disclosed herein. In some embodiments, the active material layer comprises from 30 wt % to 70 wt % of the compound, the composition, or the composite material disclosed herein. In some embodiments, the active material layer comprises from 40 wt % to 70 wt % of the compound, the composition, or the composite material disclosed herein. In some embodiments, the active material layer comprises from 40 wt % to 70 wt % of the compound, the composition, or the composite material disclosed herein. In some embodiments, the active material layer comprises from 50 wt % to 70 wt % of the compound, the composition, or the composite material disclosed herein. In some embodiments, the active material layer comprises from 60 wt % to 70 wt % of the compound, the composition, or the composite material disclosed herein.

In some embodiments, the active material layer comprises from 1 wt % to 60 wt % of the compound, the composition, or the composite material disclosed herein. In some embodiments, the active material layer comprises from 10 wt % to 60 wt % of the compound, the composition, or the composite material disclosed herein. In some embodiments, the active material layer comprises from 20 wt % to 60 wt % of the compound, the composition, or the composite material disclosed herein. In some embodiments, the active material layer comprises from 30 wt % to 60 wt % of the compound, the composition, or the composite material disclosed herein. In some embodiments, the active material layer comprises from 40 wt % to 60 wt % of the compound, the composition, or the composite material disclosed herein. In some embodiments, the active material layer comprises from 40 wt % to 60 wt % of the compound, the composition, or the composite material disclosed herein. In some embodiments, the active material layer comprises from 50 wt % to 60 wt % of the compound, the composition, or the composite material disclosed herein.

In some embodiments, the active material layer comprises from 1 wt % to 50 wt % of the compound, the composition, or the composite material disclosed herein. In some embodiments, the active material layer comprises from 10 wt % to 50 wt % of the compound, the composition, or the composite material disclosed herein. In some embodiments, the active material layer comprises from 20 wt % to 50 wt % of the compound, the composition, or the composite material disclosed herein. In some embodiments, the active material layer comprises from 30 wt % to 50 wt % of the compound, the composition, or the composite material disclosed herein. In some embodiments, the active material layer comprises from 40 wt % to 50 wt % of the compound, the composition, or the composite material disclosed herein.

In some embodiments, the active material layer comprises from 1 wt % to 40 wt % of the compound, the composition, or the composite material disclosed herein. In some embodiments, the active material layer comprises from 10 wt % to 40 wt % of the compound, the composition, or the composite material disclosed herein. In some embodiments, the active material layer comprises from 20 wt % to 40 wt % of the compound, the composition, or the composite material disclosed herein. In some embodiments, the active material layer comprises from 30 wt % to 40 wt % of the compound, the composition, or the composite material disclosed herein.

In some embodiments, the active material layer comprises from 1 wt % to 30 wt % of the compound, the composition, or the composite material disclosed herein. In some embodiments, the active material layer comprises from 10 wt % to 30 wt % of the compound, the composition, or the composite material disclosed herein. In some embodiments, the active material layer comprises from 20 wt % to 30 wt % of the compound, the composition, or the composite material disclosed herein.

In some embodiments, the active material layer comprises from 1 wt % to 20 wt % of the compound, the composition, or the composite material disclosed herein. In some embodiments, the active material layer comprises from 10 wt % to 20 wt % of the compound, the composition, or the composite material disclosed herein. In some embodiments, the active material layer comprises from 1 wt % to 10 wt % of the compound, the composition, or the composite material disclosed herein.

In some embodiments, the compound, the composition, or the composite material disclosed herein is formed before it is incorporated into the negative electrode. In some embodiments, the compound, the composition, or the composite material disclosed herein is combined with a solvent to form a slurry, applied to the current collector, and dried to form the active material layer.

In some embodiments, the solvent is a non-polar organic solvent. In some embodiments, the solvent is selected from the group consisting of xylene, toluene, hexane, heptane, isobutyl butyrate, or combinations thereof. In some embodiments, the solvent is xylene.

In some embodiments, the solvent is a polar solvent. In some embodiments, the solvent is water. In some embodiments, the solvent is N-Methyl-2-pyrrolidone (NMP).

In some embodiments, the slurry further comprises a conductive material.

In some embodiments, the conductive material is selected from the group consisting of graphite, carbon black, carbon fibers or metal fibers, metal powder, conductive whiskers, conductive metal oxide, activated carbon, polyphenylene derivatives, and combinations thereof. In some embodiments, the conductive material is selected from the group consisting of natural graphite, artificial graphite, super-p, acetylene black, ketjen black, channel black, furnace black, lamp black, thermal black, denka black, vapor grown carbon fibre, and combinations thereof.

In some embodiments, the active material layer comprises from 0.1% to 20% by weight of the conductive material. In some embodiments, the active material layer comprises from 1% to 20% by weight of the conductive material. In some embodiments, the active material layer comprises from 2% to 20% by weight of the conductive material. In some embodiments, the active material layer comprises from 5% to 20% by weight of the conductive material. In some embodiments, the active material layer comprises from 8% to 20% by weight of the conductive material. In some embodiments, the active material layer comprises from 10% to 20% by weight of the conductive material. In some embodiments, the active material layer comprises from 12% to 20% by weight of the conductive material. In some embodiments, the active material layer comprises from 15% to 20% by weight of the conductive material. In some embodiments, the active material layer comprises from 18% to 20% by weight of the conductive material.

In some embodiments, the active material layer comprises from 0.1% to 20% by weight of the conductive material. In some embodiments, the active material layer comprises from 1% to 20% by weight of the conductive material. In some embodiments, the active material layer comprises from 2% to 20% by weight of the conductive material. In some embodiments, the active material layer comprises from 5% to 20% by weight of the conductive material. In some embodiments, the active material layer comprises from 8% to 20% by weight of the conductive material. In some embodiments, the active material layer comprises from 10% to 20% by weight of the conductive material. In some embodiments, the active material layer comprises from 12% to 20% by weight of the conductive material. In some embodiments, the active material layer comprises from 15% to 20% by weight of the conductive material. In some embodiments, the active material layer comprises from 18% to 20% by weight of the conductive material.

In some embodiments, the active material layer comprises from 0.1% to 18% by weight of the conductive material. In some embodiments, the active material layer comprises from 1% to 18% by weight of the conductive material. In some embodiments, the active material layer comprises from 2% to 18% by weight of the conductive material. In some embodiments, the active material layer comprises from 5% to 18% by weight of the conductive material. In some embodiments, the active material layer comprises from 8% to 18% by weight of the conductive material. In some embodiments, the active material layer comprises from 10% to 18% by weight of the conductive material. In some embodiments, the active material layer comprises from 12% to 18% by weight of the conductive material. In some embodiments, the active material layer comprises from 15% to 18% by weight of the conductive material.

In some embodiments, the active material layer comprises from 0.1% to 15% by weight of the conductive material. In some embodiments, the active material layer comprises from 1% to 15% by weight of the conductive material. In some embodiments, the active material layer comprises from 2% to 15% by weight of the conductive material. In some embodiments, the active material layer comprises from 5% to 15% by weight of the conductive material. In some embodiments, the active material layer comprises from 8% to 15% by weight of the conductive material. In some embodiments, the active material layer comprises from 10% to 15% by weight of the conductive material. In some embodiments, the active material layer comprises from 12% to 15% by weight of the conductive material.

In some embodiments, the active material layer comprises from 0.1% to 12% by weight of the conductive material. In some embodiments, the active material layer comprises from 1% to 12% by weight of the conductive material. In some embodiments, the active material layer comprises from 2% to 12% by weight of the conductive material. In some embodiments, the active material layer comprises from 5% to 12% by weight of the conductive material. In some embodiments, the active material layer comprises from 8% to 12% by weight of the conductive material. In some embodiments, the active material layer comprises from 10% to 12% by weight of the conductive material.

In some embodiments, the active material layer comprises from 0.1% to 10% by weight of the conductive material. In some embodiments, the active material layer comprises from 1% to 10% by weight of the conductive material. In some embodiments, the active material layer comprises from 2% to 10% by weight of the conductive material. In some embodiments, the active material layer comprises from 5% to 10% by weight of the conductive material. In some embodiments, the active material layer comprises from 8% to 10% by weight of the conductive material.

In some embodiments, the active material layer comprises from 0.1% to 8% by weight of the conductive material. In some embodiments, the active material layer comprises from 1% to 8% by weight of the conductive material. In some embodiments, the active material layer comprises from 2% to 8% by weight of the conductive material. In some embodiments, the active material layer comprises from 5% to 8% by weight of the conductive material.

In some embodiments, the active material layer comprises from 0.1% to 5% by weight of the conductive material. In some embodiments, the active material layer comprises from 1% to 5% by weight of the conductive material. In some embodiments, the active material layer comprises from 2% to 5% by weight of the conductive material.

In some embodiments, the active material layer comprises from 0.1% to 2% by weight of the conductive material. In some embodiments, the active material layer comprises from 0.1% to 1% by weight of the conductive material.

In some embodiments, the slurry further comprises a binder resin.

In some embodiments, the binder resin is selected from the group consisting of polyvinylidene difluoride, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, polyacrylic acid, polyacrylic acid salt derivatives, and combinations thereof.

In some embodiments, the active material layer comprises no more than 20 wt % of the binder resin. In some embodiments, the active material layer comprises no more than 18 wt % of the binder resin. In some embodiments, the active material layer comprises no more than 15 wt % of the binder resin. In some embodiments, the active material layer comprises no more than 12 wt % of the binder resin. In some embodiments, the active material layer comprises less than 10 wt % of the binder resin. In some embodiments, the active material layer comprises no more than 8 wt % of the binder resin. In some embodiments, the active material layer comprises less than 5 wt % of the binder resin. In some embodiments, the active material layer comprises no more than 2 wt % of the binder resin. In some embodiments, the active material layer comprises no more than 1 wt % of the binder resin. In some embodiments, the active material layer comprises no more than 0.5 wt % of the binder resin. In some embodiments, the active material layer comprises no more than 0.1 wt % of the binder resin.

In some embodiments, the compound, the composition, or the composite material disclosed herein is formed in situ with the active material layer.

In some embodiments, tin oxide is combined with a solvent to form a slurry, applied to the current collector, and dried to form an active material precursor layer that is subsequently reduced by a sodium-containing organic salt to form the active material layer.

In some embodiments, the sodium-containing organic salt is sodium biphenyl. In some embodiments, the sodium-containing organic salt is sodium naphthalene.

In some embodiments, the solvent is a non-polar organic solvent. In some embodiments, the solvent is selected from the group consisting of xylene, toluene, hexane, heptane, isobutyl butyrate, or combinations thereof. In some embodiments, the solvent is xylene.

In some embodiments, the solvent is a polar solvent. In some embodiments, the solvent is water. In some embodiments, the solvent is N-Methyl-2-pyrrolidone (NMP).

In some embodiments, the slurry further comprises a conductive material.

In some embodiments, the conductive material is selected from the group consisting of graphite, carbon black, carbon fibers or metal fibers, metal powder, conductive whiskers, conductive metal oxide, activated carbon, polyphenylene derivatives, and combinations thereof. In some embodiments, the conductive material is selected from the group consisting of natural graphite, artificial graphite, super-p, acetylene black, ketjen black, channel black, furnace black, lamp black, thermal black, denka black, vapor grown carbon fibre, and combinations thereof.

In some embodiments, the active material layer comprises from 0.1% to 20% by weight of the conductive material. In some embodiments, the active material layer comprises from 1% to 20% by weight of the conductive material. In some embodiments, the active material layer comprises from 2% to 20% by weight of the conductive material. In some embodiments, the active material layer comprises from 5% to 20% by weight of the conductive material. In some embodiments, the active material layer comprises from 8% to 20% by weight of the conductive material. In some embodiments, the active material layer comprises from 10% to 20% by weight of the conductive material. In some embodiments, the active material layer comprises from 12% to 20% by weight of the conductive material. In some embodiments, the active material layer comprises from 15% to 20% by weight of the conductive material. In some embodiments, the active material layer comprises from 18% to 20% by weight of the conductive material.

In some embodiments, the active material layer comprises from 0.1% to 20% by weight of the conductive material. In some embodiments, the active material layer comprises from 1% to 20% by weight of the conductive material. In some embodiments, the active material layer comprises from 2% to 20% by weight of the conductive material. In some embodiments, the active material layer comprises from 5% to 20% by weight of the conductive material. In some embodiments, the active material layer comprises from 8% to 20% by weight of the conductive material. In some embodiments, the active material layer comprises from 10% to 20% by weight of the conductive material. In some embodiments, the active material layer comprises from 12% to 20% by weight of the conductive material. In some embodiments, the active material layer comprises from 15% to 20% by weight of the conductive material. In some embodiments, the active material layer comprises from 18% to 20% by weight of the conductive material.

In some embodiments, the active material layer comprises from 0.1% to 18% by weight of the conductive material. In some embodiments, the active material layer comprises from 1% to 18% by weight of the conductive material. In some embodiments, the active material layer comprises from 2% to 18% by weight of the conductive material. In some embodiments, the active material layer comprises from 5% to 18% by weight of the conductive material. In some embodiments, the active material layer comprises from 8% to 18% by weight of the conductive material. In some embodiments, the active material layer comprises from 10% to 18% by weight of the conductive material. In some embodiments, the active material layer comprises from 12% to 18% by weight of the conductive material. In some embodiments, the active material layer comprises from 15% to 18% by weight of the conductive material.

In some embodiments, the active material layer comprises from 0.1% to 15% by weight of the conductive material. In some embodiments, the active material layer comprises from 1% to 15% by weight of the conductive material. In some embodiments, the active material layer comprises from 2% to 15% by weight of the conductive material. In some embodiments, the active material layer comprises from 5% to 15% by weight of the conductive material. In some embodiments, the active material layer comprises from 8% to 15% by weight of the conductive material. In some embodiments, the active material layer comprises from 10% to 15% by weight of the conductive material. In some embodiments, the active material layer comprises from 12% to 15% by weight of the conductive material.

In some embodiments, the active material layer comprises from 0.1% to 12% by weight of the conductive material. In some embodiments, the active material layer comprises from 1% to 12% by weight of the conductive material. In some embodiments, the active material layer comprises from 2% to 12% by weight of the conductive material. In some embodiments, the active material layer comprises from 5% to 12% by weight of the conductive material. In some embodiments, the active material layer comprises from 8% to 12% by weight of the conductive material. In some embodiments, the active material layer comprises from 10% to 12% by weight of the conductive material.

In some embodiments, the active material layer comprises from 0.1% to 10% by weight of the conductive material. In some embodiments, the active material layer comprises from 1% to 10% by weight of the conductive material. In some embodiments, the active material layer comprises from 2% to 10% by weight of the conductive material. In some embodiments, the active material layer comprises from 5% to 10% by weight of the conductive material. In some embodiments, the active material layer comprises from 8% to 10% by weight of the conductive material.

In some embodiments, the active material layer comprises from 0.1% to 8% by weight of the conductive material. In some embodiments, the active material layer comprises from 1% to 8% by weight of the conductive material. In some embodiments, the active material layer comprises from 2% to 8% by weight of the conductive material. In some embodiments, the active material layer comprises from 5% to 8% by weight of the conductive material.

In some embodiments, the active material layer comprises from 0.1% to 5% by weight of the conductive material. In some embodiments, the active material layer comprises from 1% to 5% by weight of the conductive material. In some embodiments, the active material layer comprises from 2% to 5% by weight of the conductive material.

In some embodiments, the active material layer comprises from 0.1% to 2% by weight of the conductive material. In some embodiments, the active material layer comprises from 0.1% to 1% by weight of the conductive material.

In some embodiments, the slurry further comprises a binder resin.

In some embodiments, the binder resin is selected from the group consisting of polyvinylidene difluoride, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, polyacrylic acid, polyacrylic acid salt derivatives, and combinations thereof.

In some embodiments, the active material layer comprises no more than 20 wt % of the binder resin. In some embodiments, the active material layer comprises no more than 18 wt % of the binder resin. In some embodiments, the active material layer comprises no more than 15 wt % of the binder resin. In some embodiments, the active material layer comprises no more than 12 wt % of the binder resin. In some embodiments, the active material layer comprises less than 10 wt % of the binder resin. In some embodiments, the active material layer comprises no more than 8 wt % of the binder resin. In some embodiments, the active material layer comprises less than 5 wt % of the binder resin. In some embodiments, the active material layer comprises no more than 2 wt % of the binder resin. In some embodiments, the active material layer comprises no more than 1 wt % of the binder resin. In some embodiments, the active material layer comprises no more than 0.5 wt % of the binder resin. In some embodiments, the active material layer comprises no more than 0.1 wt % of the binder resin.

In some embodiments, the active material layer exhibits an electronic conductivity of at least 0.08 S cm$^{-1}$.

In some embodiments, the active material layer exhibits an electronic conductivity of from 0.10 S cm$^{-1}$ to 100 S cm$^{-1}$. In some embodiments, the active material layer exhibits an electronic conductivity of from 0.10 S cm$^{-1}$ to 80 S cm$^{-1}$. In some embodiments, the active material layer exhibits an electronic conductivity of from 0.10 S cm$^{-1}$ to 50 S cm$^{-1}$. In some embodiments, the active material layer exhibits an electronic conductivity of from 0.10 S cm$^{-1}$ to 40 S cm$^{-1}$. In some embodiments, the active material layer exhibits an electronic conductivity of from 0.10 S cm$^{-1}$ to 30 S cm$^{-1}$. In some embodiments, the active material layer exhibits an electronic conductivity of from 0.10 S cm$^{-1}$ to 20 S cm$^{-1}$. In some embodiments, the active material layer exhibits an electronic conductivity of from 0.10 S cm$^{-1}$ to 10 S cm$^{-1}$. In some embodiments, the active material layer exhibits an electronic conductivity of from 0.10 S cm$^{-1}$ to 5 S cm$^{-1}$. In some embodiments, the active material layer exhibits an electronic conductivity of from 0.10 S cm$^{-1}$ to 1.0 S cm$^{-1}$.

In some embodiments, the active material layer exhibits an electronic conductivity of from 0.10 S cm$^{-1}$ to 0.5 S cm$^{-1}$. In some embodiments, the active material layer exhibits an electronic conductivity of from 0.15 S cm$^{-1}$ to 0.5 S cm$^{-1}$. In some embodiments, the active material layer exhibits an electronic conductivity of from 0.20 S cm$^{-1}$ to 0.5 S cm$^{-1}$. In some embodiments, the active material layer exhibits an electronic conductivity of from 0.30 S cm$^{-1}$ to 0.5 S cm$^{-1}$. In some embodiments, the active material layer exhibits an electronic conductivity of from 0.4 S cm$^{-1}$ to 0.5 S cm$^{-1}$.

In some embodiments, the active material layer exhibits an electronic conductivity of from 0.10 S cm$^{-1}$ to 0.4 S cm$^{-1}$. In some embodiments, the active material layer exhibits an electronic conductivity of from 0.15 S cm$^{-1}$ to 0.4 S cm$^{-1}$. In some embodiments, the active material layer exhibits an electronic conductivity of from 0.20 S cm$^{-1}$ to 0.4 S cm$^{-1}$. In some embodiments, the active material layer exhibits an electronic conductivity of from 0.30 S cm$^{-1}$ to 0.4 S cm$^{-1}$.

In some embodiments, the active material layer exhibits an electronic conductivity of from 0.10 S cm$^{-1}$ to 0.3 S cm$^{-1}$. In some embodiments, the active material layer exhibits an electronic conductivity of from 0.15 S cm$^{-1}$ to 0.3 S cm$^{-1}$. In some embodiments, the active material layer exhibits an electronic conductivity of from 0.20 S cm$^{-1}$ to 0.3 S cm$^{-1}$.

In some embodiments, the active material layer exhibits an electronic conductivity of from 0.10 S cm$^{-1}$ to 0.2 S cm$^{-1}$. In some embodiments, the active material layer exhibits an electronic conductivity of from 0.15 S cm$^{-1}$ to 0.2 S cm$^{-1}$. In some embodiments, the active material layer exhibits an electronic conductivity of from 0.10 S cm$^{-1}$ to 0.15 S cm$^{-1}$.

In some embodiments, the negative electrode active material has a bulk density before first charge/discharge cycle of 1 to 7 g/cm$^3$. In some embodiments, the negative electrode active material has a bulk density before first charge/discharge cycle of 2 to 7 g/cm$^3$. In some embodiments, the negative electrode active material has a bulk density before first charge/discharge cycle of 3 to 7 g/cm$^3$. In some embodiments, the negative electrode active material has a bulk density before first charge/discharge cycle of 4 to 7 g/cm$^3$. In some embodiments, the negative electrode active material has a bulk density before first charge/discharge cycle of 5 to 7 g/cm$^3$. In some embodiments, the negative electrode active material has a bulk density before first charge/discharge cycle of 6 to 7 g/cm$^3$.

In some embodiments, the negative electrode active material has a bulk density before first charge/discharge cycle of 1 to 6 g/cm$^3$. In some embodiments, the negative electrode active material has a bulk density before first charge/discharge cycle of 2 to 6 g/cm$^3$. In some embodiments, the negative electrode active material has a bulk density before first charge/discharge cycle of 3 to 6 g/cm$^3$. In some embodiments, the negative electrode active material has a bulk density before first charge/discharge cycle of 4 to 6 g/cm$^3$. In some embodiments, the negative electrode active material has a bulk density before first charge/discharge cycle of 5 to 6 g/cm$^3$.

In some embodiments, the negative electrode active material has a bulk density before first charge/discharge cycle of 1 to 5 g/cm$^3$. In some embodiments, the negative electrode active material has a bulk density before first charge/discharge cycle of 2 to 5 g/cm$^3$. In some embodiments, the negative electrode active material has a bulk density before first charge/discharge cycle of 3 to 5 g/cm$^3$. In some embodiments, the negative electrode active material has a bulk density before first charge/discharge cycle of 4 to 5 g/cm$^3$.

In some embodiments, the negative electrode active material has a bulk density before first charge/discharge cycle of 1 to 4 g/cm$^3$. In some embodiments, the negative electrode active material has a bulk density before first charge/discharge cycle of 2 to 4 g/cm$^3$. In some embodiments, the negative electrode active material has a bulk density before first charge/discharge cycle of 3 to 4 g/cm$^3$.

In some embodiments, the negative electrode active material has a bulk density before first charge/discharge cycle of 1 to 3 g/cm$^3$. In some embodiments, the negative electrode active material has a bulk density before first charge/discharge cycle of 2 to 3 g/cm$^3$. In some embodiments, the negative electrode active material has a bulk density before first charge/discharge cycle of 1 to 2 g/cm$^3$.

Battery

According to one aspect of the present disclosure, provided in certain embodiments herein are batteries comprising: a) the negative electrode disclosed herein, b) a positive electrode and c) an electrolyte comprising a solid state electrolyte or a liquid electrolyte soaked separator membrane interposed between the negative electrode and the positive electrode.

In some embodiments, the electrolyte comprises at least one solid or liquid electrolyte material selected from the group consisting of solid borohydride material ($Na_2B_{10}H_{10}$, $Na_2B_{12}H_{12}$, $NaCB_{11}H_{12}$), solid sulfide-based solid electrolyte ($Na_3PS_4$), liquid ether based electrolyte ($NaPF_6$ in Diethylene glycol dimethyl or other ethers), liquid carbonate based electrolyte ($NaPF_6$ in Ethylene carbonate and Dimethyl carbonate), or combination thereof.

In some embodiments, the positive electrode comprises a positive electrode active material layer, the positive electrode active material layer comprises sodium transition metal oxide active material as a positive electrode active material, and the transition metal comprises at least one of Cr, Mn, Fe or V.

In some embodiments, the positive electrode comprises a positive electrode active material layer, the positive electrode active material layer comprises sodium ferrocyanide positive electrode as a positive electrode active material, and the positive electrode comprises at least one of Fe or Mn.

In some embodiments, the positive electrode active material layer further comprises at least one of a binder resin, a conductive material or a solid electrolyte.

In some embodiments, the positive electrode active material layer is obtained using the positive electrode active material, the conductive material and the binder resin by a manufacturing method according to a dry mixing process without a solvent.

In some embodiments, the battery has an NP ratio of 0.1 to 30. In some embodiments, the battery has an NP ratio of 0.5 to 10. In some embodiments, the battery has an NP ratio of 0.8 to 10. In some embodiments, the battery has an NP ratio of 1.0 to 10. In some embodiments, the battery has an NP ratio of 1.0 to 5. In some embodiments, the battery has an NP ratio of 1.0 to 1.5.

In some embodiments, the battery has a coulombic efficiency of at least 95% for the first 12 cycles. In some embodiments, the battery has a coulombic efficiency of at least 95% for the first 8 cycles. In some embodiments, the battery has a coulombic efficiency of at least 95% for the first 6 cycles. In some embodiments, the battery has a coulombic efficiency of at least 95% for the first 4 cycles. In some embodiments, the battery has a coulombic efficiency of at least 95% for the first 2 cycles.

In some embodiments, the battery has a normalized discharge capacity of at least 0.95 after 2 cycles. In some embodiments, the battery has a normalized discharge capacity of at least 0.90 after 4 cycles. In some embodiments, the battery has a normalized discharge capacity of at least 0.90 after 6 cycles. In some embodiments, the battery has a normalized discharge capacity of at least 0.85 after 8 cycles. In some embodiments, the battery has a normalized discharge capacity of at least 0.85 after 12 cycles.

In various embodiments herein, inclusions and materials are described as having specific characteristics. It is to be understood that such disclosures include disclosures of a plurality of such inclusions having an average equal to the specific characteristics identified, and vice-versa.

Certain Technical Effects

The sodium secondary battery according to the present disclosure has a high energy density due to the use of the dense negative electrode active material sodium tin oxide ($Na_xSnO_y$) in the negative electrode. Additionally, the negative electrode exhibits an amorphous structure, attributed to the absence of crystalline sodium, tin, or tin oxide in the structure. The amorphous structure improves the mechanical property and reduces the volume change experienced during charge/discharge. Additionally, using the sodium tin oxide ($Na_xSnO_y$) negative electrode and a borohydride solid electrolyte, a solid electrolyte interphase (SEI) layer is not formed on the negative electrode interface, thereby preventing the loss of the active material and maintaining the battery capacity, as well as avoiding the impedance rise. Additionally, the sodium tin oxide ($Na_xSnO_y$) is found to be stable toward processing solvents, which is necessary during the manufacturing process. Previously reported sodium containing alloys have been found to be unstable with organic solvents, making them impractical for commercialization. With these features, the battery according to the present disclosure has good electrical and chemical properties including stability towards organic solvents, high energy density, long durability and coulombic efficiency.

NON-LIMITING EXAMPLES

The following Examples are detailed by way of illustration only and are not to be construed as limiting in spirit or in scope, many modifications both in materials and in methods will be apparent to those skilled in the art.

Example 1—Manufacturing—Melt Process

In some embodiments, sodium tin oxide ($Na_xSnO_y$) of the present disclosure is prepared through a melt process with an optional size reduction and homogenization process, such as through ball milling. As a non-limiting example, 2 grams of sodium metal is mixed with 10 grams of tin oxide in a melt reaction vessel. The melt reaction vessel was heat at 150° C. above the melting point of sodium metal for 0.25 hours until the sodium tin oxide ($Na_xSnO_y$) material is formed with y being less than 2.0.

After cooling, a portion of the material was analyzed through scanning electron microscopy (SEM), as shown in FIG. 1A. The rest of the material was transferred to a planetary ball milling machine and milled at 50-250 rpm, 250-350 rpm, and 350-1000 rpm from 0.1 to 2 hours, and analyzed through SEM, as shown in FIGS. 1B, 1C, and 1D, respectively.

Example 2—Manufacturing—Liquid Electrolyte Process

In some embodiments, sodium tin oxide ($Na_xSnO_y$) is manufactured through a reduction reaction mediated by a liquid electrolyte. As a non-limiting example, tin oxide is first dispersed in a slurry with a solvent and a binder, and cast onto a current collector substrate before drying in vacuum under elevated temperatures. The tin oxide laminated onto the current collect substrate is then chemically and/or electrochemically reduced by direct electrical contact with sodium metal for a fixed duration while being soaked in a sodium based liquid electrolyte to form an active material layer of NaxSnOy.

Example 3—Manufacturing—Electrochemical Process

In some embodiments, sodium tin oxide ($Na_xSnO_y$) is manufactured through a electrochemical reduction process with a sodium containing counter electrode. As a non-limiting example, tin oxide is first dispersed in a slurry with a solvent and a binder, and cast onto a current collector substrate before drying in vacuum under elevated temperatures. The tin oxide laminated onto the current collect substrate is then electrochemically reduced by applying an electrochemical potential difference between the tin oxide electrode and a sodium containing counter electrode to form an active material layer of NaxSnOy. In some cases, an optional sacrificial sodium containing electrode or salt is also used. Exemplary sodium containing counter electrode may include, but are not limited to, sodium metal, sodium transition metal oxides, sodium peroxides, sodium carbonate, sodium oxide, sodium nitrate, sodium nitride, or other sodium organic salts.

Example 4—Crystallinity/Amorphousness

Figure 2:
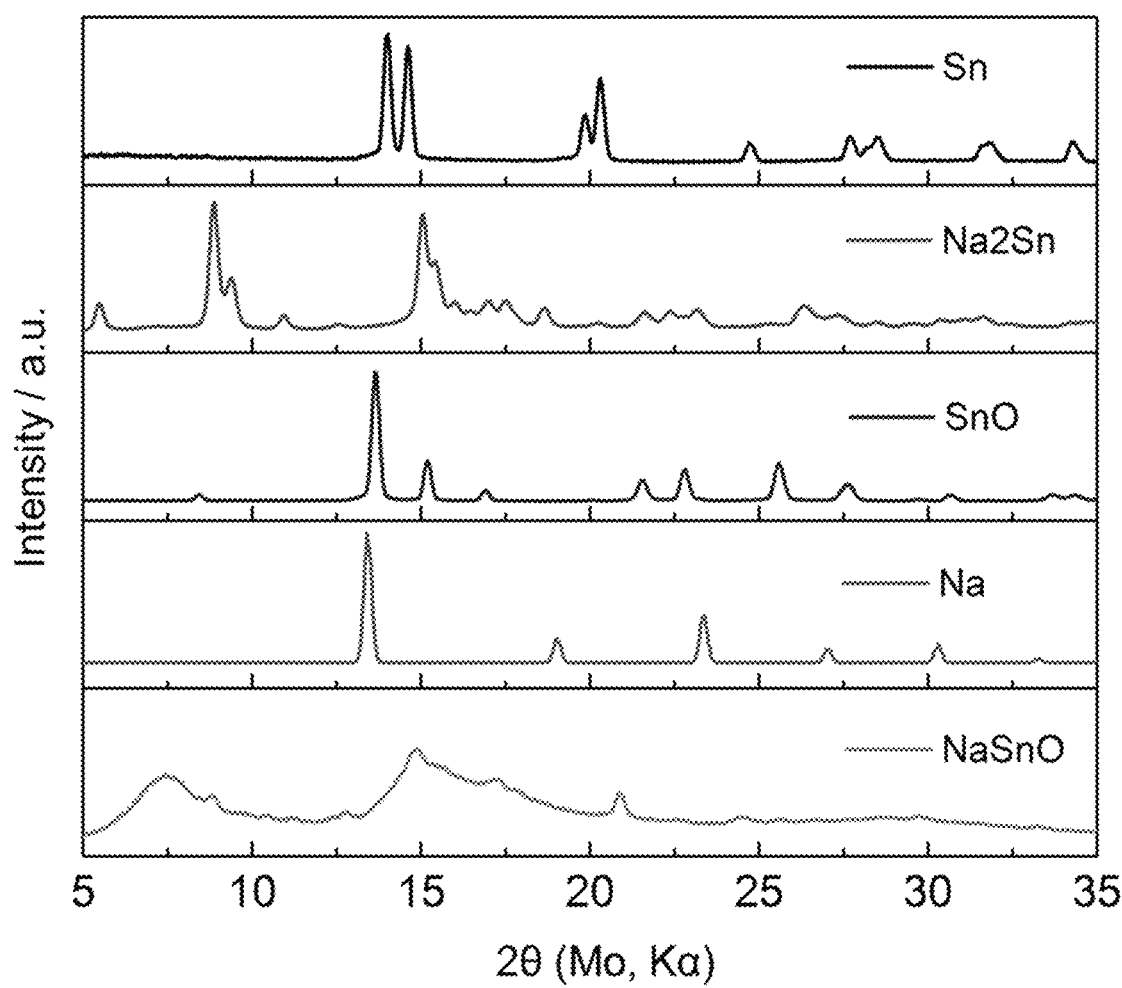
FIG. 2 shows an X-ray diffraction pattern of sodium tin oxide ($Na_xSnO_y$), along with references for elemental tin, tin oxide, and sodium tin alloy, showing the relatively amorphous nature of sodium tin oxide ($Na_xSnO_y$) used in this disclosure, evident from the diffuse shape of its diffraction patterns.

To demonstrate the crystallinity/amorphousness of the disclosed electrode material, elemental tin (Sn), elemental sodium (Na), tin oxide (SnO), sodium-tin alloy ($Na_2Sn$), and sodium tin oxide ($Na_xSnO_y$) was analyzed using XRD. As shown in FIG. 2, elemental tin, elemental sodium, tin oxide, and sodium tin alloy, all exhibited various degrees of crystallinity, while sodium tin oxide ($Na_xSnO_y$) is relatively amorphous.

Example 5—Conductivity

Figure 3:
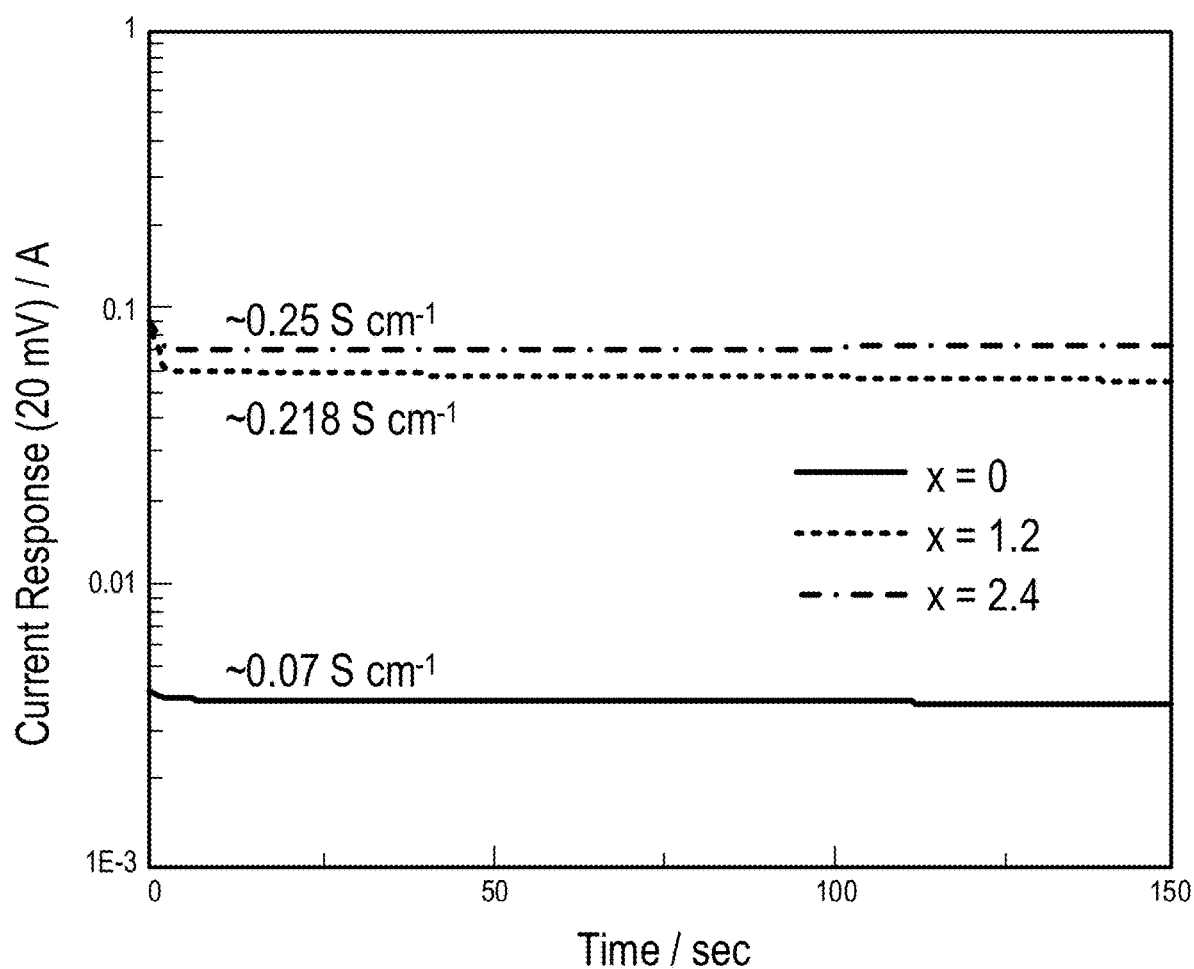
FIG. 3 shows the direct current polarization measurements of sodium tin oxide ($Na_xSnO_y$) of different particle sizes, along with the calculated electronic conductivities.

FIG. 3 shows the electronic conductivity of the active material layer under different conditions. The measurements were performed using a DC polarization method. The active material powder was first compressed in a PEEK die to form a dense pellet. The polarization was then applied using two titanium current collectors at both ends of the pellet.

As shown in FIG. 3, an active material layer containing stannous oxide without sodium added provides an electronic conductivity of 0.07 S cm-1. Whereas an active material layer containing the compounds, composition, and composite material of the present disclosure provides an electronic conductivity increase of 1 order of magnitude, to 0.18 S cm-1 and 0.25 S cm-1 for x=1.2 and x=2.4 respectively. FIG. 3 also shows a flat current response for all materials, indicating steady state value is reached at the onset of the measurement.

Example 6—First Cycle Coulombic Efficiency

To prepare the measurements, the solid electrolyte material was first compressed in a PEEK die to form a dense solid electrolyte separator pellet. Subsequently, the anode and cathode active material powders were spread across each side of the solid electrolyte separator pellet and compressed again to form the full cell pellet. Titanium current collectors were used to apply the charge and discharge current tests. The full cells were cycled at a rate of C/10 between 1.7V to 3.4V at room temperature. The first cycle coulombic efficiency can be determined by the ratio between the capacity obtained in the discharge cycle to the capacity obtained in the charge cycle.

Figure 4:
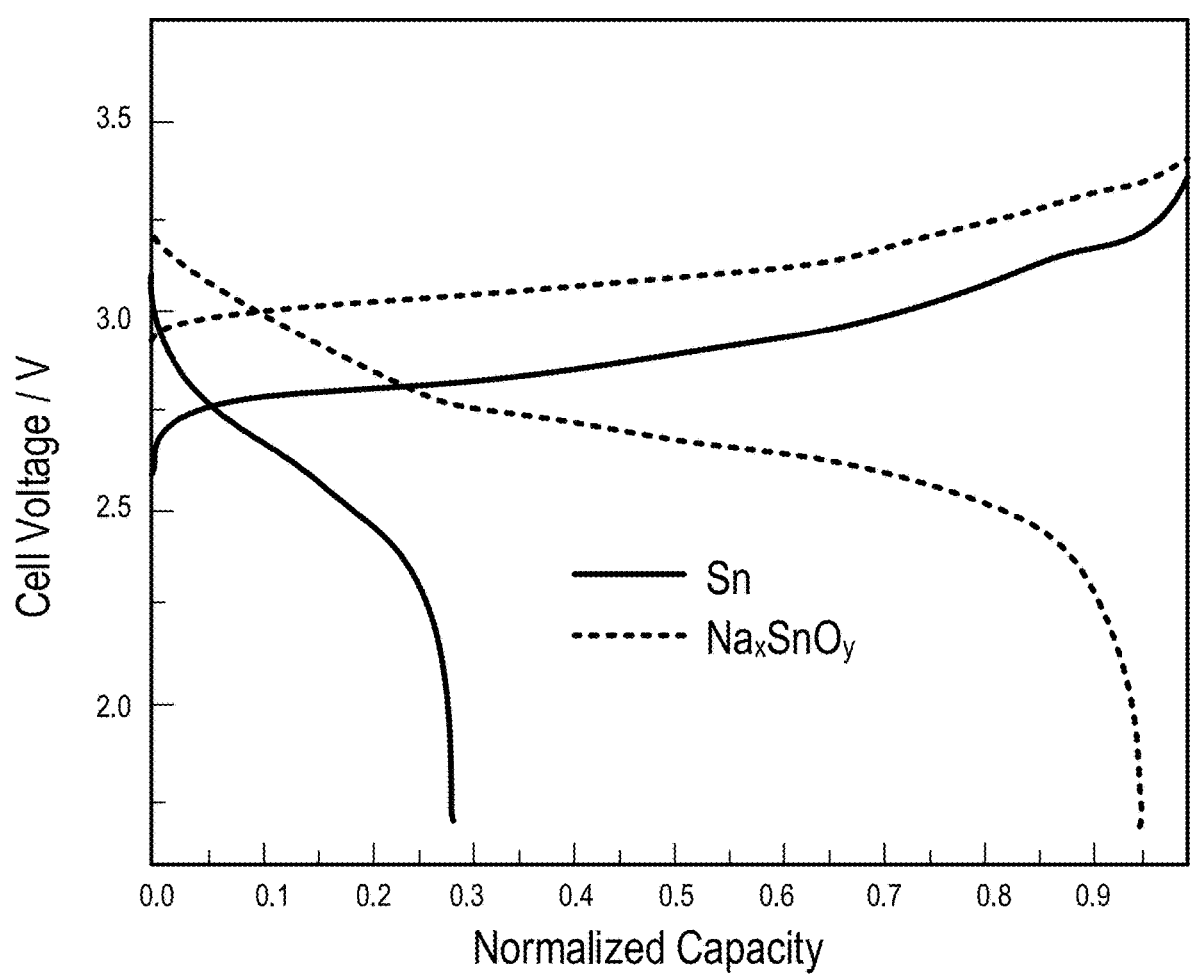
FIG. 4 shows the $1^{st}$ cycle full cell voltage curve and coulombic efficiency of a sodium secondary battery comparing the battery using commercial tin vs sodium tin oxide ($Na_xSnO_y$) used in this disclosure.

As shown in FIG. 4, the NaxSnOy achieved a high first cycle coulombic efficiency of at least 95%, significantly higher than elemental Sn reference, which achieved under 30%. This is attributed to the highly reversible sodiation and desodiation of the active material, which maximizes usable energy in the device.

Figure 6:
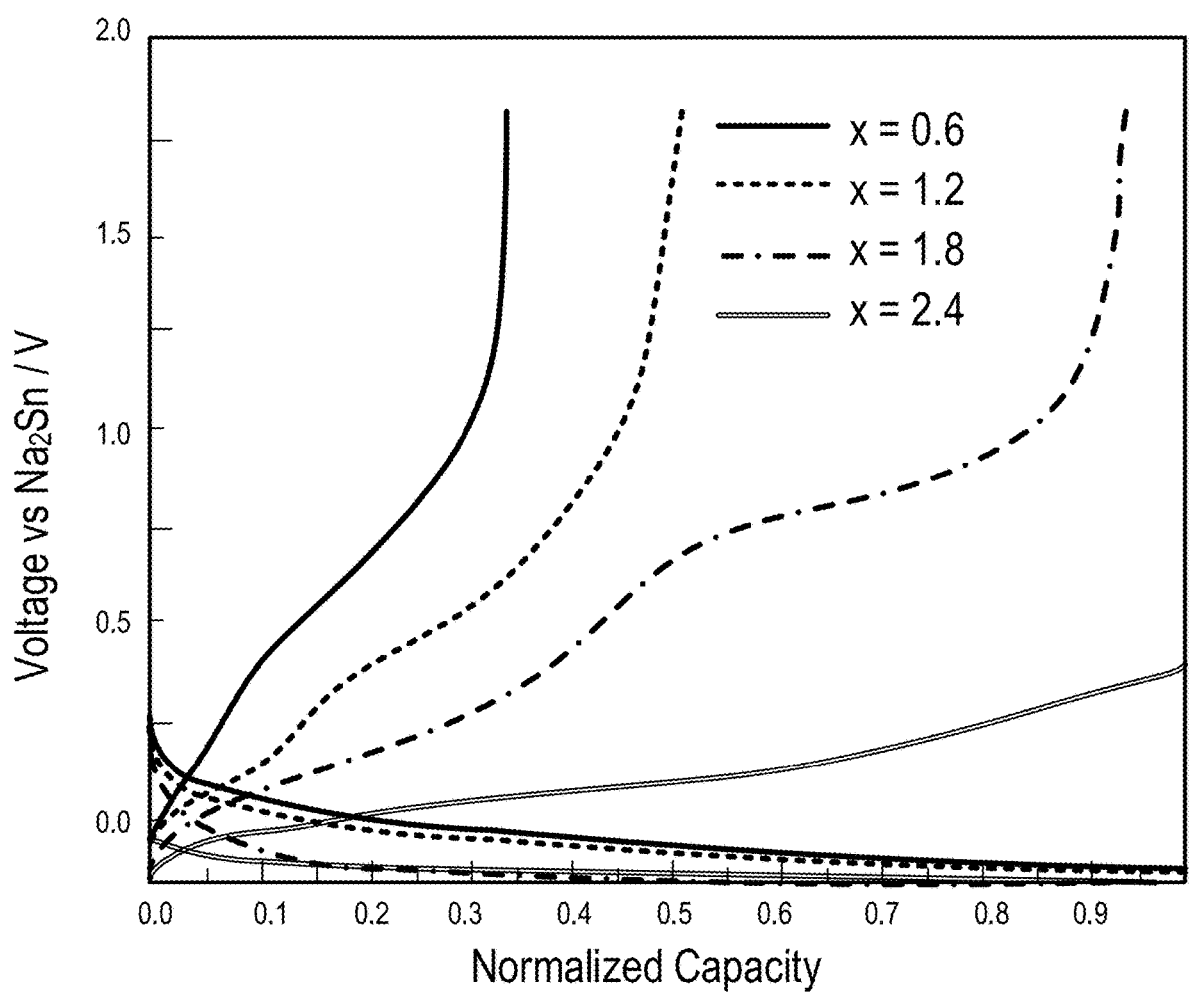
FIG. 6 shows the $1^{st}$ cycle half-cell voltage curve and coulombic efficiency of sodium tin oxide ($Na_xSnO_y$) half cells as x is varied between 0.1 to 0.4.

As shown in FIG. 6, the NaxSnOy achieved different first cycle coulombic efficiency values depending on the value of x, for a specific cell setup and operating conditions. For values above 1.8, the NaxSnOy achieves a first cycle coulombic efficiency value of 100% within the operating conditions of the cell.

Figure 7:
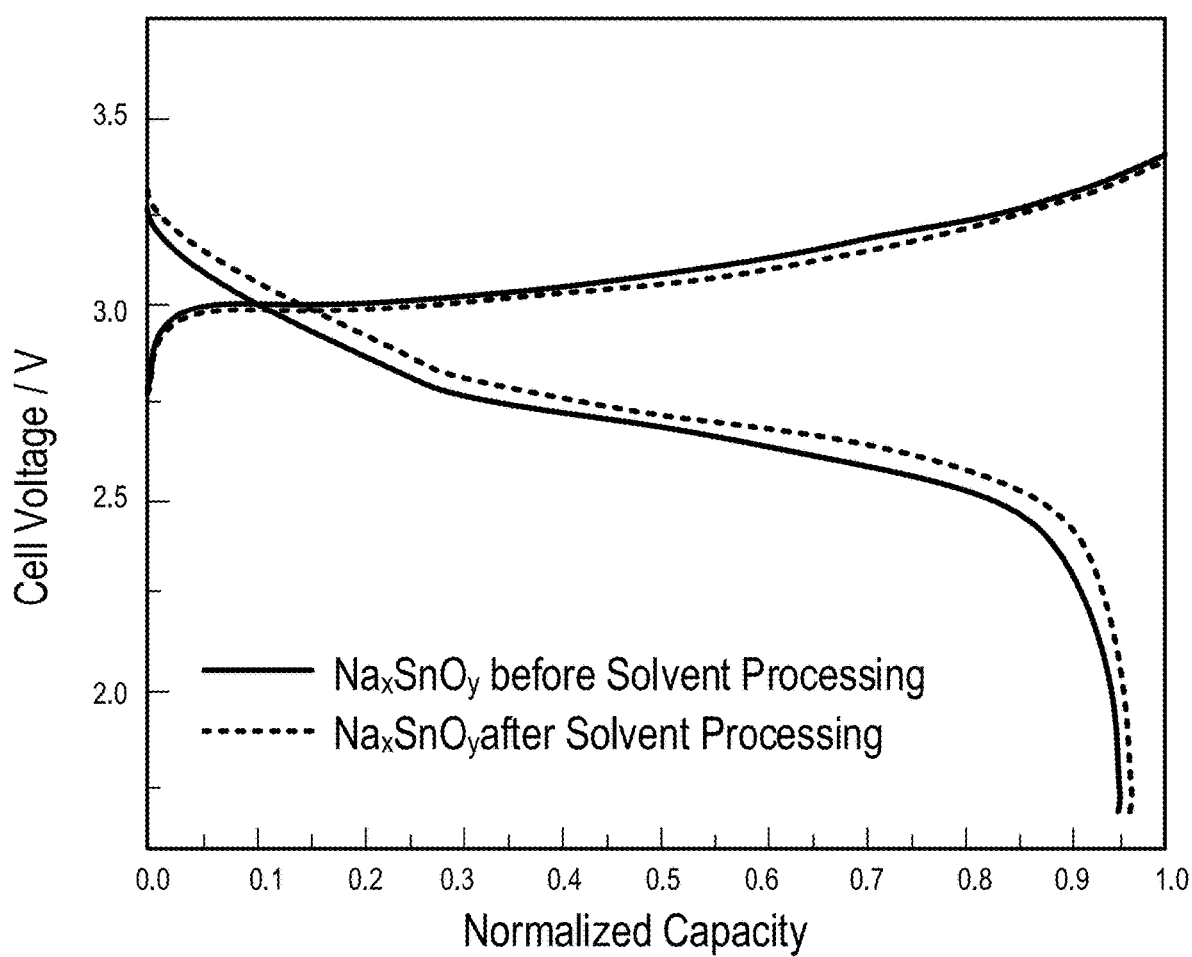
FIG. 7 shows the $1^{st}$ cycle voltage curve and coulombic efficiency of sodium tin oxide ($Na_xSnO_y$) full cells before and after it is processed with Xylene organic solvent.

As shown in FIG. 7, the NaxSnOy achieved similar first cycle coulombic efficiency values and voltage profile before and after organic solvent processing, indicating the stability of the active material layer against the organic solvents chosen.

Figure 8:
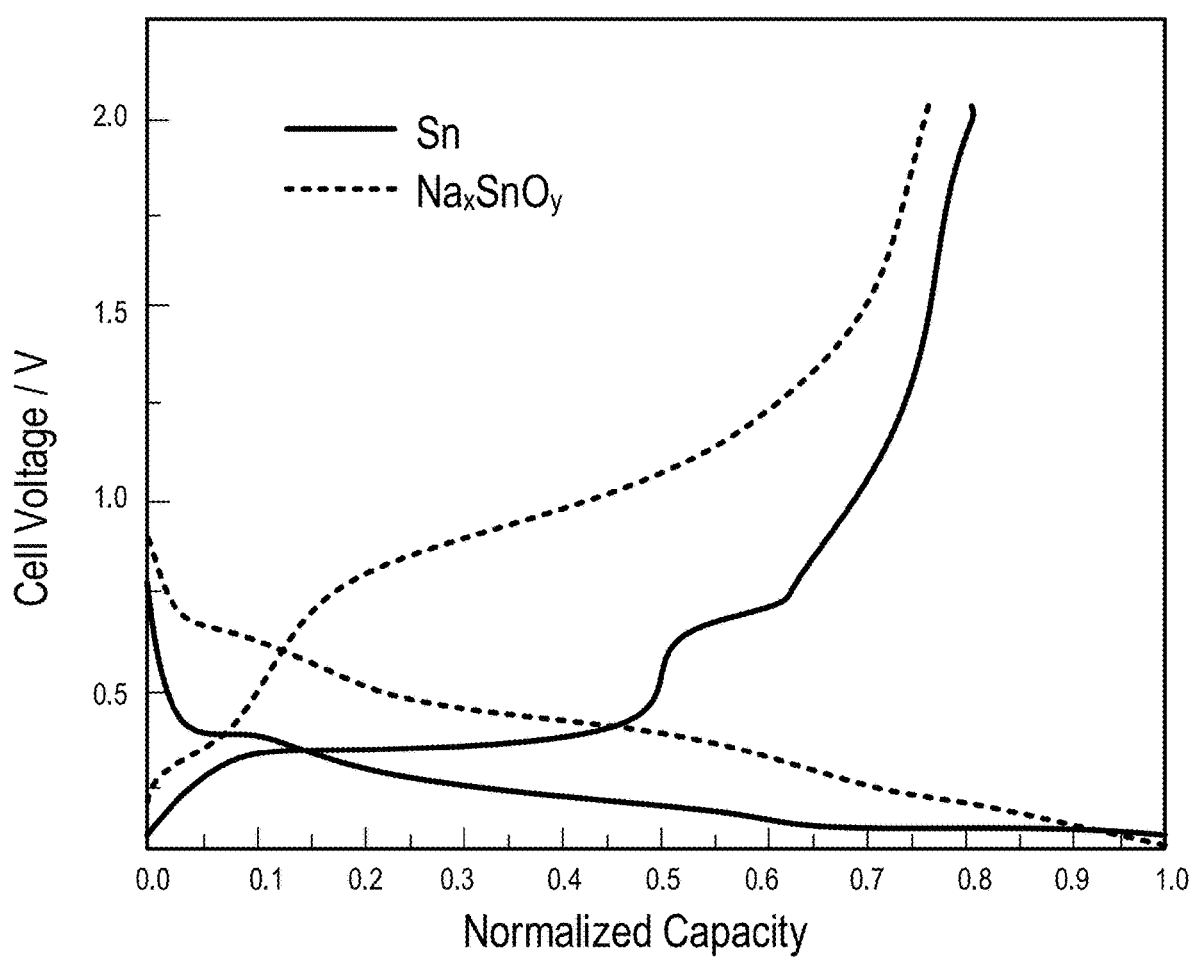
FIG. 8 shows the $1^{st}$ cycle half-cell voltage curve and coulombic efficiency of sodium tin oxide ($Na_xSnO_y$) half cells when cycled with an ether based organic liquid electrolyte.

As shown in FIG. 8, the NaxSnOy displays a significantly different voltage profile as compared to elemental Sn, with fewer defined features such as distinct voltage plateaus indicative of crystalline phase transitions in elemental Sn, in contrast to amorphous NaxSnOy that displays fewer distinct voltage plateaus.

Example 7—Average Coulombic Efficiency

To prepare the measurements, the solid electrolyte material was first compressed in a PEEK die to form a dense solid electrolyte separator pellet. Subsequently, the anode and cathode active material powders were spread across each side of the solid electrolyte separator pellet and compressed again to form the full cell pellet. Titanium current collectors were used to apply the charge and discharge current tests. The full cells were cycled at a rate of C/10 between 1.7V to 3.4V at room temperature. This was repeated over 12 cycles to understand their relative capacity retention and average coulombic efficiencies.

Figure 5:
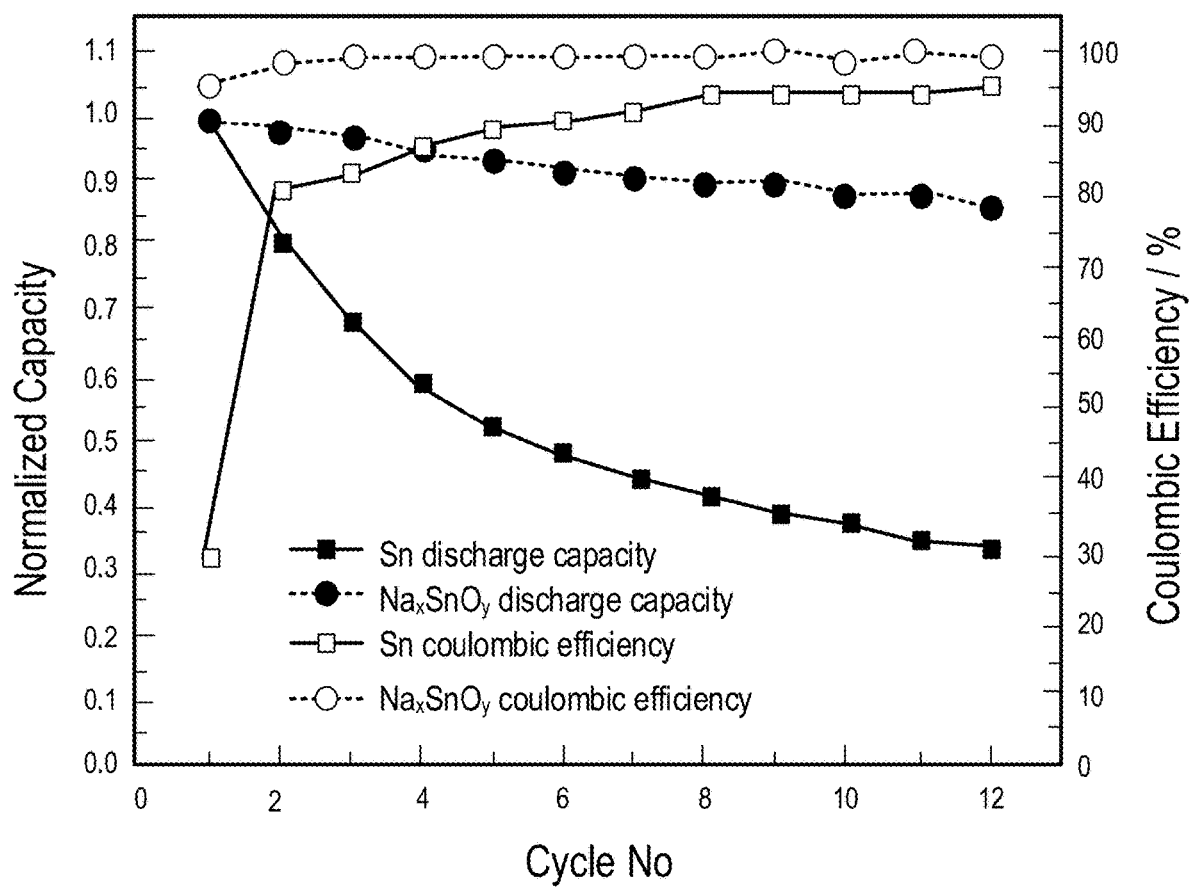
FIG. 5 shows the cycle performance and average coulombic efficiencies over the first 15 cycles of the sodium secondary battery using commercial tin vs sodium tin oxide ($Na_xSnO_y$) used in this disclosure.

As shown in FIG. 5, the NaxSnOy achieved a high average coulombic efficiency of near 100%, significantly higher than elemental Sn reference, which achieved an average coulombic efficiency of under 95%. This results in an improved capacity retention of the cell using the NaxSnOy active material compared to elemental Sn reference. Additionally, it is observed that the coulombic efficiency of the cell using NaxSnOy active material quickly reached a stable value by the 3rd cycle, while the cell using elemental Sn reference only reached a stable value near the 10th cycle.

Example 8—Negative Electrode

As a non-limiting example, negative electrode incorporating the sodium tin oxide ($Na_xSnO_y$) disclosed herein was prepared by the following process.

The active material, along with binder and carbon additives in a predetermined composition are dispersed the organic solvent using a slurry mixing tool until a sufficiency viscous suspension is achieved. Subsequently, the slurry suspension is cast using a fixed gaps doctor blade onto an aluminum current collect substrate. The entire substrate with active material layer cast on it is then dried in a vacuum environment under a temperature of 120° C. for 2 hours to achieve the final dried electrode.

Figure 9:
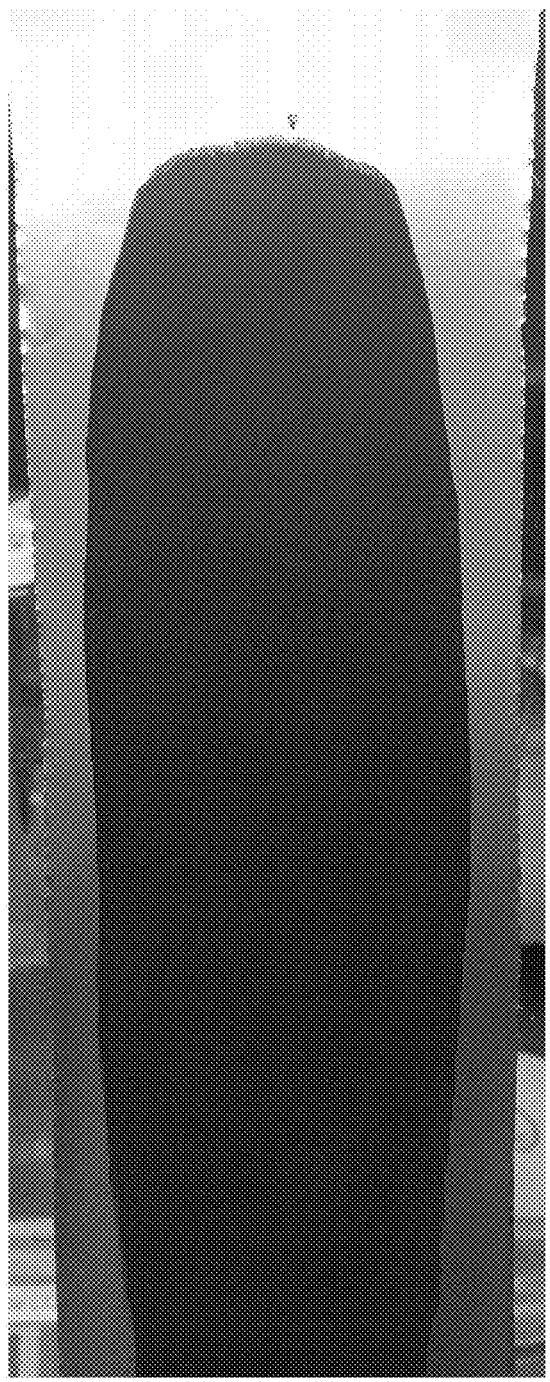
FIG. 9 are digital images of sodium tin oxide ($Na_xSnO_y$) negative electrode manufactured by xylene organic solvent.

FIG. 9 is a digital image of the negative electrode prepared by the process described above, using xylene organic solvent.

Example 9—Density

Figure 10:
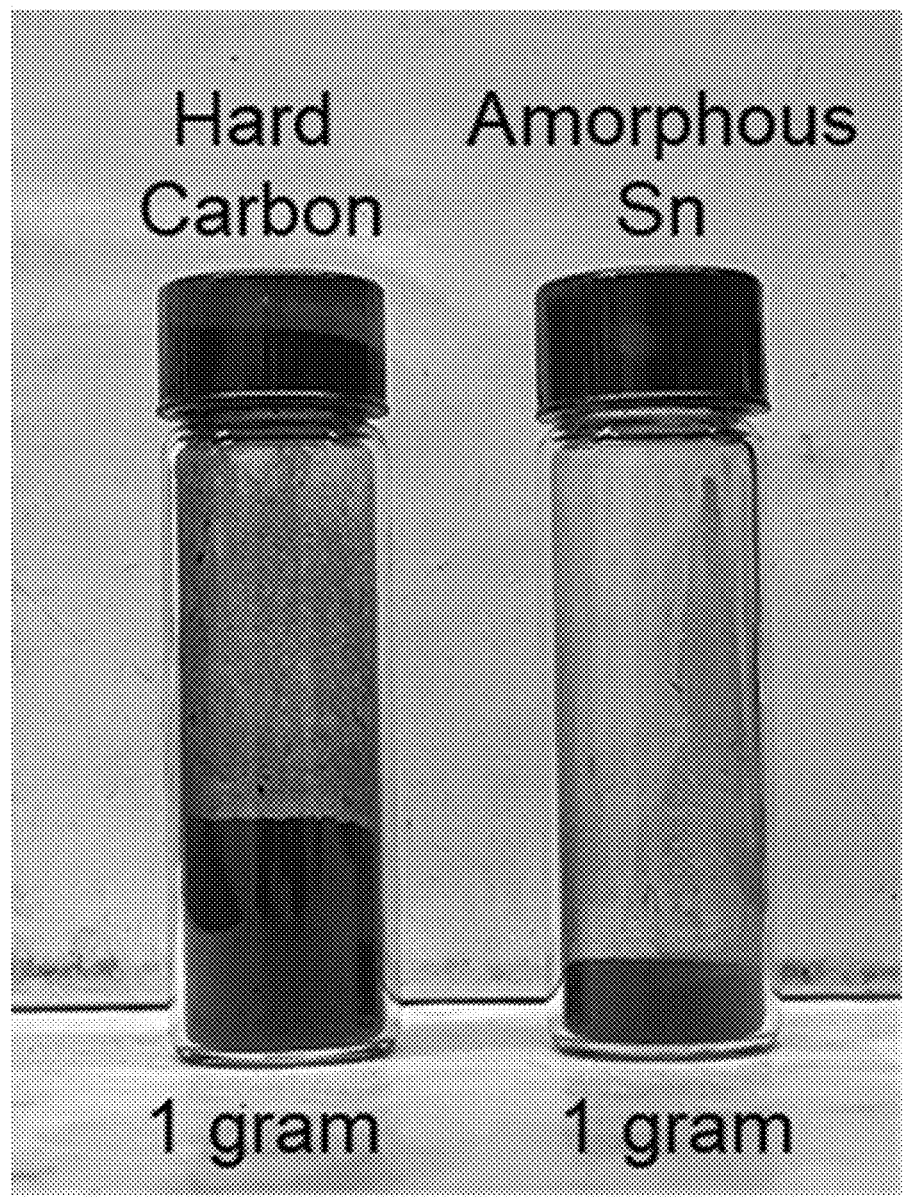
FIG. 10 are digital images of conventional hard carbon anode vs sodium tin oxide ($Na_xSnO_y$) of equal masses showing the differences in density.

As a non-limiting example to demonstrate the high density feature of the sodium tin oxide ($Na_xSnO_y$) material disclosed herein, FIG. 10 provides digital images of conventional hard carbon electrode material vs sodium tin oxide ($Na_xSnO_y$) disclosed herein of equal masses. As shown in FIG. 10, sodium tin oxide disclosed herein (right) has a density that is about 2-4 times of the density of the conventional hard carbon electrode material (left).

Non-Limiting Embodiments

The following Embodiments are detailed by way of illustration only and are not to be construed as limiting in spirit or in scope, many modifications both in materials and in methods will be apparent to those skilled in the art.

Embodiment 1: A compound having a chemical formula of NaxSnOy, wherein x is no more than 5.0, and wherein y is less than 2.0.

Embodiment 2: The compound of embodiment 1, wherein y is from 0.1 to 1.9.

Embodiment 3: The compound of embodiment 1, wherein y is from 0.3 to 1.7.

Embodiment 4: The compound of embodiment 1, wherein y is from 0.5 to 1.5.

Embodiment 5: The compound of embodiment 1, wherein y is from 0.7 to 1.3.

Embodiment 6: The compound of embodiment 1, wherein y is from 0.9 to 1.1.

Embodiment 7: The compound of embodiment 1, wherein y is about 1.0.

Embodiment 8: The compound of embodiment 1-7, wherein x is from 0.1 to 5.0

Embodiment 9: The compound of embodiment 1-8, wherein x is from 0.1 to 3.75.

Embodiment 10: The compound of embodiment 1-9, wherein x is from 0.3 to 3.5.

Embodiment 11: The compound of embodiment 1-10, wherein x is from 0.5 to 3.0.

Embodiment 12: The compound of embodiment 1-11, wherein x is from 0.8 to 2.8.

Embodiment 13: The compound of embodiment 1-12, wherein x is about 1.2.

Embodiment 14: The compound of embodiment 1-12, wherein x is about 1.8.

Embodiment 15: The compound of embodiment 1-12, wherein x is about 2.4.

Embodiment 16: A composition consisting essentially of sodium (Na), tin (Sn), and oxygen (O), wherein a molar ratio between Sn and O is less than 2.0.

Embodiment 17: The composition of embodiment 16, wherein the molar ratio between O and Sn is from 0.1 to 1.9.

Embodiment 18: The composition of embodiment 16-17, wherein the molar ratio between O and Sn is from 0.3 to 1.7.

Embodiment 19: The composition of embodiment 16-18, wherein the molar ratio between O and Sn is from 0.5 to 1.5.

Embodiment 20: The composition of embodiment 16-19, wherein the molar ratio between O and Sn is from 0.7 to 1.3.

Embodiment 21: The composition of embodiment 16-20, wherein the molar ratio between O and Sn is from 0.9 to 1.1.

Embodiment 22: The composition of embodiment 16-21, wherein the molar ratio between O and Sn is about 1.0.

Embodiment 23: The composition of embodiment 16-22, wherein a molar ratio between Na and Sn is less than 5.0.

Embodiment 24: The composition of embodiment 16-23, wherein a molar ratio between Na and Sn is from 0.1 to 3.75.

Embodiment 25: The composition of embodiment 16-24, wherein a molar ratio between Na and Sn is from 0.3 to 3.5.

Embodiment 26: The composition of embodiment 16-25, wherein a molar ratio between Na and Sn is from 0.5 to 3.0.

Embodiment 27: The composition of embodiment 16-26, wherein a molar ratio between Na and Sn is from 0.8 to 2.8.

Embodiment 28: The composition of embodiment 16-27, wherein a molar ratio between Na and Sn is about 1.2.

Embodiment 29: The composition of embodiment 16-27, wherein a molar ratio between Na and Sn is about 1.8.

Embodiment 30: The composition of embodiment 16-27, wherein a molar ratio between Na and Sn is about 2.4.

Embodiment 31: The composition of embodiments 16-30, wherein the composition consists of sodium (Na), tin (Sn), and oxygen (O).

Embodiment 32: The composition of embodiments 16-31, wherein the composition is amorphous.

Embodiment 33: The composition of embodiments 16-32, in a form of micro-sized and/or nano-sized particles.

Embodiment 34: The composition of embodiment 33, wherein the particles have an average diameter of from about 10 nm to about 50 μm.

Embodiment 35: The composition of embodiment 33, wherein the particles have an average diameter of from about 100 nm to about 10 μm.

Embodiment 36: The composition of embodiment 33, wherein the particles have an average diameter of from about 1 μm to about 5 μm.

Embodiment 37: A composite material formed by contacting tin oxide with a reducing agent or by electrochemically reducing tin oxide, wherein a molar ratio between O and Sn in the composite material is less than 2.0.

Embodiment 38: The composite material of embodiment 37, wherein the reducing agent is sodium metal.

Embodiment 39: The composite material of embodiment 38, wherein the sodium metal is combined with tin oxide in a melt reaction vessel, and optionally further ball milled with a milling media, to form the composite material.

Embodiment 39.1: The composite material of claim 39, wherein the tin oxide is in contact with the sodium metal in the presence of a electrolyte, and wherein optionally the tin oxide is coated on a current collector.

Embodiment 40: The composite material of embodiment 37, wherein the reducing agent is an organic sodium salt.

Embodiment 41: The composite material of embodiment 40, wherein the organic sodium salt is sodium biphenyl, sodium naphthalene, or combination thereof.

Embodiment 41.1: The composite material of embodiment of claim 37, formed by electrochemically reducing tin oxide by a sodium based counter electrode.

Embodiment 41.2: The composite material of embodiment 41.1, wherein the sodium based counter electrode comprise a counter electrode material selected from the group consisting of sodium metal, sodium transition metal oxides, sodium peroxides, sodium carbonate, sodium oxide, sodium nitrate, sodium nitride, sodium organic salts, and combinations thereof.

Embodiment 42: The composite material of embodiment 37-41.2, wherein the molar ratio between O and Sn is from 0.1 to 1.9.

Embodiment 43: The composite material of embodiment 37-42, wherein the molar ratio between O and Sn is from 0.3 to 1.7.

Embodiment 44: The composite material of embodiment 37-43, wherein the molar ratio between O and Sn is from 0.5 to 1.5.

Embodiment 45: The composite material of embodiment 37-44, wherein the molar ratio between O and Sn is from 0.7 to 1.3.

Embodiment 46: The composite material of embodiment 37-45, wherein the molar ratio between O and Sn is from 0.9 to 1.1.

Embodiment 47: The composite material of embodiment 37-46, wherein the molar ratio between O and Sn is about 1.0.

Embodiment 48: The composite material of embodiment 37-47, wherein a molar ratio between Na and Sn is less than 5.0.

Embodiment 49: The composite material of embodiment 37-48, wherein a molar ratio between Na and Sn is from 0.1 to 3.75.

Embodiment 50: The composite material of embodiment 37-49, wherein a molar ratio between Na and Sn is from 0.3 to 3.5.

Embodiment 51: The composite material of embodiment 37-50, wherein a molar ratio between Na and Sn is from 0.5 to 3.0.

Embodiment 52: The composite material of embodiment 37-51, wherein a molar ratio between Na and Sn is from 0.8 to 2.8.

Embodiment 53: The composite material of embodiment 37-52, wherein a molar ratio between Na and Sn is about 1.2.

Embodiment 54: The composite material of embodiment 37-52, wherein a molar ratio between Na and Sn is about 1.8.

Embodiment 55: The composite material of embodiment 37-52, wherein a molar ratio between Na and Sn is about 2.4.

Embodiment 56: The composite material of embodiments 37-55, wherein the composite material consists of sodium (Na), tin (Sn), and oxygen (O).

Embodiment 57: The composite material of embodiments 37-56, wherein the composite material is amorphous.

Embodiment 58: The composite material of embodiments 37-57, in a form of micro-sized and/or nano-sized particles.

Embodiment 59: The composite material of embodiment 58, wherein the particles have an average diameter of from about 10 nm to about 50 μm.

Embodiment 60: The composite material of embodiment 58, wherein the particles have an average diameter of from about 100 nm to about 10 μm.

Embodiment 61: The composite material of embodiment 58, wherein the particles have an average diameter of from about 1 μm to about 5 μm.

Embodiment 62: A negative electrode comprising the compound of embodiments 1-15, the composition of embodiments 16-36, or the composite material of embodiments 37-61.

Embodiment 63: The negative electrode of embodiment 62, wherein the compound of embodiments 1-15, the composition of embodiments 16-36, or the composite material of embodiments 37-61 is present in an active material layer coated over a current collector.

Embodiment 64: The negative electrode of embodiment 62-63, wherein the active material layer comprises at least 1 wt % of the compound of embodiments 1-15, the composition of embodiments 16-36, or the composite material of embodiments 37-61.

Embodiment 65: The negative electrode of embodiment 62-63, wherein the active material layer comprises at least 10 wt % of the compound of embodiments 1-15, the composition of embodiments 16-36, or the composite material of embodiments 37-61.

Embodiment 66: The negative electrode of embodiment 62-63, wherein the active material layer comprises at least 20 wt % of the compound of embodiments 1-15, the composition of embodiments 16-36, or the composite material of embodiments 37-61.

Embodiment 67: The negative electrode of embodiment 62-63, wherein the active material layer comprises at least 40 wt % of the compound of embodiments 1-15, the composition of embodiments 16-36, or the composite material of embodiments 37-61.

Embodiment 68: The negative electrode of embodiment 62-63, wherein the active material layer comprises at least 60 wt % of the compound of embodiments 1-15, the composition of embodiments 16-36, or the composite material of embodiments 37-61.

Embodiment 69: The negative electrode of embodiment 62-63, wherein the active material layer comprises at least 80 wt % of the compound of embodiments 1-15, the composition of embodiments 16-36, or the composite material of embodiments 37-61.

Embodiment 70: The negative electrode of embodiment 62-69, wherein the active material layer comprises at least 90 wt % of the compound of embodiments 1-15, the composition of embodiments 16-36, or the composite material of embodiments 37-61

Embodiment 71: The negative electrode of embodiment 62-70, wherein the compound of embodiments 1-15, the composition of embodiments 16-36, or the composite material of embodiments 37-61 is formed before it is incorporated into the negative electrode.

Embodiment 72: The negative electrode of embodiment 71, wherein the compound of embodiments 1-10, the composition of embodiments 11-26, or the composite material of embodiments 27-47 is combined with a solvent to form a slurry, applied to the current collector, and dried to form the active material layer.

Embodiment 73: The negative electrode of embodiment 72, wherein the solvent is a non-polar organic solvent.

Embodiment 74: The negative electrode of embodiment 72, wherein the solvent is selected from the group consisting of xylene, toluene, hexane, heptane, isobutyl butyrate, or combinations thereof.

Embodiment 75: The negative electrode of embodiment 72, wherein the solvent is xylene.

Embodiment 76: The negative electrode of embodiment 72, wherein the solvent is a polar solvent.

Embodiment 77: The negative electrode of embodiment 72, wherein the solvent is water.

Embodiment 78: The negative electrode of embodiment 72, wherein the solvent is N-Methyl-2-pyrrolidone (NMP).

Embodiment 79: The negative electrode of embodiment 72-78, wherein the slurry further comprises a conductive material.

Embodiment 80: The negative electrode of embodiment 79, wherein the conductive material is selected from the group consisting of graphite, carbon black, carbon fibers or metal fibers, metal powder, conductive whiskers, conductive metal oxide, activated carbon, polyphenylene derivatives, and combinations thereof.

Embodiment 81: The negative electrode of embodiment 79, wherein the conductive material is selected from the group consisting of natural graphite, artificial graphite, super-p, acetylene black, ketjen black, channel black, furnace black, lamp black, thermal black, denka black, vapor grown carbon fibre, and combinations thereof.

Embodiment 82: The negative electrode of embodiment 79-81, wherein the active material layer comprises from 0.1% to 20% by weight of the conductive material.

Embodiment 83: The negative electrode of embodiment 72-82, wherein the slurry further comprises a binder resin.

Embodiment 84: The negative electrode of embodiment 83, wherein the binder resin is selected from the group consisting of polyvinylidene difluoride, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, polyacrylic acid, polyacrylic acid salt derivatives, and combinations thereof.

Embodiment 85: The negative electrode of embodiment 83-84, wherein the active material layer comprises no more than 20 wt % of the binder resin.

Embodiment 86: The negative electrode of embodiment 83-84, wherein the active material layer comprises less than 10 wt % of the binder resin.

Embodiment 87: The negative electrode of embodiment 83-84, wherein the active material layer comprises less than 5 wt % of the binder resin.

Embodiment 88: The negative electrode of embodiment 62-70, wherein the compound of embodiments 1-15, the composition of embodiments 16-36, or the composite material of embodiments 37-61 is formed in situ with the active material layer.

Embodiment 89: The negative electrode of embodiment 88, wherein tin oxide is combined with a solvent to form a slurry, applied to the current collector, and dried to form an active material precursor layer that is subsequently reduced by a sodium-containing organic salt to form the active material layer.

Embodiment 90: The negative electrode of embodiment 89, wherein the solvent is a non-polar organic solvent.

Embodiment 91: The negative electrode of embodiment 89, wherein the solvent is selected from the group consisting of xylene, toluene, hexane, heptane, isobutyl butyrate, or combinations thereof.

Embodiment 92: The negative electrode of embodiment 89, wherein the solvent is xylene.

Embodiment 93: The negative electrode of embodiment 89, wherein the solvent is a polar solvent.

Embodiment 94: The negative electrode of embodiment 89, wherein the solvent is water.

Embodiment 95: The negative electrode of embodiment 89, wherein the solvent is N-Methyl-2-pyrrolidone (NMP).

Embodiment 96: The negative electrode of embodiment 89-95, wherein the slurry further comprises a conductive material.

Embodiment 97: The negative electrode of embodiment 96, wherein the conductive material is selected from the group consisting of graphite, carbon black, carbon fibers or metal fibers, metal powder, conductive whiskers, conductive metal oxide, activated carbon, polyphenylene derivatives, and combinations thereof.

Embodiment 98: The negative electrode of embodiment 96, wherein the conductive material is selected from the group consisting of natural graphite, artificial graphite, super-p, acetylene black, ketjen black, channel black, furnace black, lamp black, thermal black, denka black, vapor grown carbon fibre, and combinations thereof.

Embodiment 99: The negative electrode of embodiment 96-98, wherein the active material layer comprises from 0.1% to 20% by weight of the conductive material.

Embodiment 100: The negative electrode of embodiment 89-99, wherein the slurry further comprises a binder resin.

Embodiment 101: The negative electrode of embodiment 100, wherein the binder resin is selected from the group consisting of polyvinylidene difluoride, polyvinylidene fluoride-co-hexafluoropropylene, polyvinylidene fluoride-co-trichloroethylene, polymethylmethacrylate, polyethylhexyl acrylate, polybutylacrylate, polyacrylonitrile, polyvinylpyrrolidone, polyvinylacetate, polyethylene-co-vinyl acetate, polyethylene oxide, polyarylate, cellulose acetate, cellulose acetate butyrate, cellulose acetate propionate, cyanoethylpullulan, cyanoethylpolyvinylalcohol, cyanoethylcellulose, cyanoethylsucrose, pullulan and carboxyl methyl cellulose, polyacrylic acid, polyacrylic acid salt derivatives, and combinations thereof.

Embodiment 102: The negative electrode of embodiment 100-101, wherein the active material layer comprises less than 20 wt % of the binder resin.

Embodiment 103: The negative electrode of embodiment 100-101, wherein the active material layer comprises less than 10 wt % of the binder resin.

Embodiment 104: The negative electrode of embodiment 100-101, wherein the active material layer comprises less than 5 wt % of the binder resin.

Embodiment 105: The negative electrode of embodiment 89-104, wherein the sodium-containing organic salt is sodium biphenyl.

Embodiment 106: The negative electrode of embodiment 89-104, wherein the sodium-containing organic salt is sodium naphthalene.

Embodiment 107: The negative electrode of embodiment 63-106, wherein the active material layer exhibits an electronic conductivity of at least 0.08 S cm$^{-1}$.

Embodiment 108: The negative electrode of embodiment 63-106, wherein the active material layer exhibits an electronic conductivity of from 0.10 S cm$^{-1}$ to 100 S cm$^{-1}$.

Embodiment 109: The negative electrode of embodiment 63-106, wherein the active material layer exhibits an electronic conductivity of from 0.10 S cm$^{-1}$ to 1.0 S cm$^{-1}$.

Embodiment 110: The negative electrode of embodiment 63-106, wherein the active material layer exhibits an electronic conductivity of from 0.10 S cm$^{-1}$ to 0.5 S cm$^{-1}$.

Embodiment 111: The negative electrode of embodiment 63-106, wherein the active material layer exhibits an electronic conductivity of from 0.15 S cm$^{-1}$ to 0.4 S cm$^{-1}$.

Embodiment 112: The negative electrode of embodiment 63-111, wherein the negative electrode active material has a bulk density before first charge/discharge cycle of 1 to 7 g/cm$^3$.

Embodiment 113: The negative electrode of embodiment 63-111, wherein the negative electrode active material has a bulk density before first charge/discharge cycle of 2 to 7 g/cm$^3$.

Embodiment 114: A battery comprising: a) the negative electrode of embodiment 63-113, b) a positive electrode and c) an electrolyte comprising a solid state electrolyte or a liquid electrolyte soaked separator membrane interposed between the negative electrode and the positive electrode.

Embodiment 115: The battery of embodiment 114, wherein the electrolyte comprises at least one solid or liquid electrolyte material selected from the group consisting of solid borohydride material ($Na_2B_{10}H_{10}$, $Na_2B_{12}H_{12}$, $NaCB_{11}H_{12}$), solid sulfide-based solid electrolyte ($Na_3PS_4$), liquid ether based electrolyte ($NaPF_6$ in Diethylene glycol dimethyl or other ethers), liquid carbonate based electrolyte ($NaPF_6$ in Ethylene carbonate and Dimethyl carbonate), or combination thereof.

Embodiment 116: The battery of embodiment 114-115, wherein the positive electrode comprises a positive electrode active material layer, the positive electrode active material layer comprises sodium transition metal oxide active material as a positive electrode active material, and the transition metal comprises at least one of Cr, Mn, Fe or V.

Embodiment 117: The battery of embodiment 114-115, wherein the positive electrode comprises a positive electrode active material layer, the positive electrode active material layer comprises sodium ferrocyanide positive electrode as a positive electrode active material, and the positive electrode comprises at least one of Fe or Mn.

Embodiment 118: The battery of embodiment 114-117, wherein the positive electrode active material layer further comprises at least one of a binder resin, a conductive material or a solid electrolyte.

Embodiment 119: The battery of embodiment 114-118, wherein the positive electrode active material layer is obtained using the positive electrode active material, the conductive material and the binder resin by a manufacturing method according to a dry mixing process without a solvent.

Embodiment 120: The battery of embodiment 114-119, wherein the battery has an NP ratio of 0.1 to 30.

Embodiment 121: The battery of embodiment 114-119, wherein the battery has an NP ratio of 0.5 to 10.

Embodiment 122: The battery of embodiment 114-119, wherein the battery has an NP ratio of 0.8 to 10.

Embodiment 123: The battery of embodiment 114-119, wherein the battery has an NP ratio of 1.0 to 10.

Embodiment 124: The battery of embodiment 114-119, wherein the battery has an NP ratio of 1.0 to 5.

Embodiment 125: The battery of embodiment 114-119, wherein the battery has an NP ratio of 1.0 to 1.5.

Embodiment 126: The battery of embodiment 114-119, wherein the battery has a coulombic efficiency of at least 95% for the first 12 cycles.

Embodiment 127: The battery of embodiment 114-119, wherein the battery has a coulombic efficiency of at least 95% for the first 8 cycles.

Embodiment 128: The battery of embodiment 114-119, wherein the battery has a coulombic efficiency of at least 95% for the first 6 cycles.

Embodiment 129: The battery of embodiment 114-119, wherein the battery has a coulombic efficiency of at least 95% for the first 4 cycles.

Embodiment 130: The battery of embodiment 114-119, wherein the battery has a coulombic efficiency of at least 95% for the first 2 cycles.

Embodiment 131: The battery of embodiment 114-130, wherein the battery has a normalized discharge capacity of at least 0.95 after 2 cycles.

Embodiment 132: The battery of embodiment 114-130, wherein the battery has a normalized discharge capacity of at least 0.90 after 4 cycles.

Embodiment 133: The battery of embodiment 114-130, wherein the battery has a normalized discharge capacity of at least 0.90 after 6 cycles.

Embodiment 134: The battery of embodiment 114-130, wherein the battery has a normalized discharge capacity of at least 0.85 after 8 cycles.

Embodiment 135: The battery of embodiment 114-130, wherein the battery has a normalized discharge capacity of at least 0.85 after 12 cycles.

What is claimed is:

1. A composition consisting essentially of sodium (Na), tin (Sn), and oxygen (O), wherein a molar ratio between O and Sn is less than 2.0.

2. The composition of claim 1, wherein the molar ratio between O and Sn is from 0.1 to 1.9.

3. The composition of claim 1, wherein the molar ratio between O and Sn is from 0.3 to 1.7.

4. The composition of claim 1, wherein the molar ratio between O and Sn is from 0.5 to 1.5.

5. The composition of claim 1, wherein the molar ratio between O and Sn is from 0.7 to 1.3.

6. The composition of claim 1, wherein the molar ratio between O and Sn is from 0.9 to 1.1.

7. The composition of claim 1, wherein the molar ratio between O and Sn is about 1.0.

8. The composition of claim 1, wherein a molar ratio between Na and Sn is less than 5.0.

9. The composition of claim 1, wherein a molar ratio between Na and Sn is from 0.1 to 3.75.

10. The composition of claim 1, wherein a molar ratio between Na and Sn is from 0.3 to 3.5.

11. The composition of claim 1, wherein a molar ratio between Na and Sn is from 0.5 to 3.0.

12. The composition of claim 1, wherein a molar ratio between Na and Sn is from 0.8 to 2.8.

13. The composition of claim 1, wherein a molar ratio between Na and Sn is about 1.2.

14. The composition of claim 1, wherein a molar ratio between Na and Sn is about 1.8.

15. The composition of claim 1, wherein a molar ratio between Na and Sn is about 2.4.

16. The composition of claim 1, wherein the composition consists of sodium (Na), tin (Sn), and oxygen (O).

17. The composition of claim 1, wherein the composition is amorphous.

18. The composition of claim 1, where the composition is in a form of micro-sized and/or nano-sized particles.

19. The composition of claim 18, wherein the particles have an average diameter of from about 10 nm to about 50 µm.

20. The composition of claim 19, wherein the composition has a bulk density of 1 to 7 g/cm$^3$.

21. The composition of claim 1, wherein the composition is formed by contacting tin oxide with a reducing agent.

22. The composition of claim 21, wherein the reducing agent is sodium metal.

23. The composition of claim 22, wherein the sodium metal is combined with tin oxide in a melt reaction vessel, and optionally further ball milled, to form the composition.

24. The composition of claim 22, wherein the tin oxide is in contact with the sodium metal in the presence of a liquid electrolyte, and wherein optionally the tin oxide is coated on a current collector.

25. The composition of claim 21, wherein the reducing agent is an organic sodium salt.

26. The composition of claim 25, wherein the organic sodium salt is sodium biphenyl, sodium naphthalene, or combination thereof.

27. The composition of claim 1, wherein the composition is formed by electrochemically reducing tin oxide by a sodium based counter electrode.

28. The composition of claim 27, wherein the sodium based counter electrode comprise a counter electrode material selected from the group consisting of sodium metal, sodium transition metal oxides, sodium peroxides, sodium carbonate, sodium oxide, sodium nitrate, sodium nitride, sodium organic salts, and combinations thereof.

29. A negative electrode comprising the composition of claim 1.

30. A battery comprising the negative electrode of claim 29, a positive electrode, and an electrolyte comprising a solid state electrolyte or a liquid electrolyte soaked separator membrane interposed between the negative electrode and the positive electrode.

* * * * *